(12) United States Patent
Chhabra et al.

(10) Patent No.: US 9,501,668 B2
(45) Date of Patent: Nov. 22, 2016

(54) SECURE VIDEO OUPUT PATH

(71) Applicants: Siddhartha Chhabra, Hillsboro, OR (US);
(Continued)

(72) Inventors: Siddhartha Chhabra, Hillsboro, OR (US);
(Continued)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/036,263

(22) Filed: Sep. 25, 2013

(65) Prior Publication Data
US 2015/0086012 A1 Mar. 26, 2015

(51) Int. Cl.
*H04N 7/167* (2011.01)
*G06F 21/82* (2013.01)
(Continued)

(52) U.S. Cl.
CPC .............. *G06F 21/82* (2013.01); *G06F 21/84* (2013.01); *G06F 21/85* (2013.01);
(Continued)

(58) Field of Classification Search
CPC .......... G06F 21/82; G06F 21/84; G06F 21/85; G06F 21/53
See application file for complete search history.

(56) References Cited

U.S. PATENT DOCUMENTS

2003/0005295 A1  1/2003  Girard
2003/0235304 A1* 12/2003  Evans et al. .................. 380/216
(Continued)

FOREIGN PATENT DOCUMENTS

JP  2003284024 A  10/2003
WO  2010/057065 A3  5/2010
(Continued)

OTHER PUBLICATIONS

Anati, Ittai, et al., "Innovative Technology for CPU Based Attestation and Sealing", Intel Corporation, 2013, pp. 1-7.
(Continued)

*Primary Examiner* — Samson Lemma
*Assistant Examiner* — Arya Golriz
(74) *Attorney, Agent, or Firm* — Lowenstein Sandler LLP

(57) ABSTRACT

Systems and methods for secure delivery of output surface bitmaps to a display engine. An example processing system comprises: an architecturally protected memory; and a processing core communicatively coupled to the architecturally protected memory, the processing core comprising a processing logic configured to implement an architecturally-protected execution environment by performing at least one of: executing instructions residing in the architecturally protected memory and preventing an unauthorized access to the architecturally protected memory; wherein the processing logic is further configured to provide a secure video output path by generating an output surface bitmap encrypted with a first encryption key and storing an encrypted first encryption key in an external memory, wherein the encrypted first encryption key is produced by encrypting the first encryption key with a second encryption key.

20 Claims, 11 Drawing Sheets

(71) Applicants: Uday R. Savagaonkar, Portland, OR (US); Prashant Dewan, Hillsboro, OR (US); David M. Durham, Beaverton, OR (US); Balaji Vembu, Folsom, CA (US); Xiaozhu Kang, Fremont, CA (US); Scott Janus, Rocklin, CA (US); Jason Martin, Beaverton, OR (US); Vincent R. Scarlata, Beaverton, OR (US)

(72) Inventors: Uday R. Savagaonkar, Portland, OR (US); Prashant Dewan, Hillsboro, OR (US); David M. Durham, Beaverton, OR (US); Balaji Vembu, Folsom, CA (US); Xiaozhu Kang, Fremont, CA (US); Scott Janus, Rocklin, CA (US); Jason Martin, Beaverton, OR (US); Vincent R. Scarlata, Beaverton, OR (US)

(51) Int. Cl.
| | |
|---|---|
| *G06F 21/84* | (2013.01) |
| *G06F 21/85* | (2013.01) |
| *H04N 21/41* | (2011.01) |
| *H04N 21/4143* | (2011.01) |
| *H04N 21/4367* | (2011.01) |

(52) U.S. Cl.
CPC ...... *H04N 21/4122* (2013.01); *H04N 21/4143* (2013.01); *H04N 21/4367* (2013.01)

(56) References Cited

U.S. PATENT DOCUMENTS

| | | | |
|---|---|---|---|
| 2004/0109563 A1 | 6/2004 | Evans et al. | |
| 2004/0174998 A1 | 9/2004 | Youatt et al. | |
| 2005/0100163 A1* | 5/2005 | Buer | 380/259 |
| 2007/0130470 A1* | 6/2007 | Blom et al. | 713/181 |
| 2011/0252232 A1* | 10/2011 | De Atley et al. . G06F 17/30117 | 713/165 |
| 2011/0264626 A1* | 10/2011 | Gautam et al. | 707/626 |
| 2012/0297200 A1* | 11/2012 | Thom et al. | 713/189 |
| 2013/0159726 A1* | 6/2013 | McKeen et al. | 713/189 |
| 2013/0166922 A1 | 6/2013 | Wong et al. | |

FOREIGN PATENT DOCUMENTS

| | | |
|---|---|---|
| WO | WO2010/057065 A | 5/2010 |
| WO | WO2011/078855 A9 | 6/2011 |

OTHER PUBLICATIONS

Greene, James, "Intel® Trusted Execution Technology—Hardware-based Technology for Enhancing Server Platform Security", Intel Corporation, Copyright 2010-2012, 8 pages.
Hoekstra, Matthew, et al., "Using Innovative Instructions to Create Trustworthy Software Solutions", Intel Corporation, Copyright 2013, pp. 1-8.
McKeen, Frank, et al., "Innovative Instructions and Software Model for Isolated Execution", Intel Corporation, Copyright 2013, pp. 1-8.
"Software Guard Extensions Programming Reference", Intel Corporation, Chapters 1-7, Reference No. 329298-001US, Sep. 2013, 156 Pages.
PCT Written Opinion of the International Searching Authority for PCT Application PCT/US2014/057121, mailed Dec. 12, 2014, 5 pages.
PCT International Preliminary Report on Patentability for PCT Application PCT/US2014/057121, mailed Mar. 29, 2016, 5 pages.

* cited by examiner

| Bind Key Structure | | | | |
|---|---|---|---|---|
| Name of Offset | Offset | Size (bytes) | Description | Set by |
| BTID | 0 | 4 | Target device | Software |
| BTSVN | 4 | 4 | Target Security version number. MBZ for display | Software |
| BTPOLICY | 8 | 8 | Target device policy | Software |
| TKEY | 16 | 16 | Target key | Software/Hardware |
| RSVD(0) | 32 | 8 | Reserved | Software |
| SEQID | 40 | 8 | Seed for generating Initialization vector (IV) and value for key wearout protection (KEY_ID) | Hardware |
| MAC | 48 | 16 | MAC on the encrypted key, target ID, policy, and SVN | Hardware |

FIG. 4

SECURE VIDEO OUPUT PATH

TECHNICAL FIELD

The present disclosure is generally related to computer systems, and is specifically related to systems and method for securing video output paths of computer systems.

BACKGROUND

Various applications executed by computer systems may employ a display engine to render their output surfaces on a display. An application may generate an output surface bitmap and store it in a memory buffer accessible by the display engine. The latter may read the memory buffer and render the output surface on a display.

BRIEF DESCRIPTION OF THE DRAWINGS

The present disclosure is illustrated by way of examples, and not by way of limitation, and may be more fully understood with references to the following detailed description when considered in connection with the figures, in which:

FIG. 4 schematically illustrates a data structure providing an input parameter for the EBIND instruction, in accordance with one or more aspects of the present disclosure;

DETAILED DESCRIPTION

Figure 1:
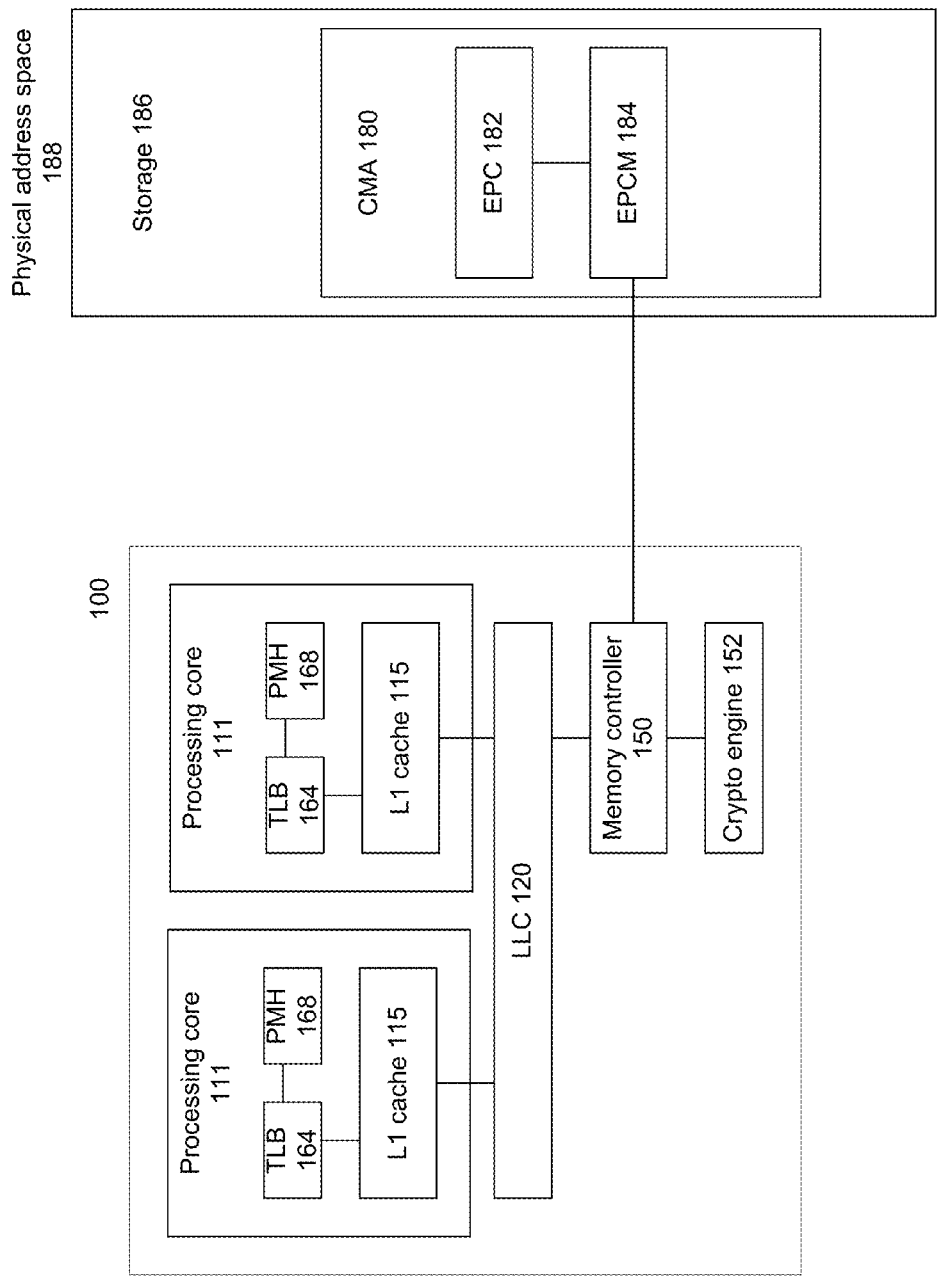
FIG. 1 depicts a high-level component diagram of an example processing system, in accordance with one or more aspects of the present disclosure.

Described herein are processing systems and related methods for secure delivery of output surface bitmaps to a display engine.

Applications being executed and the data accessed by the applications may be protected at the micro-architectural level, e.g., by implementing secure enclaves, as described in more details herein below. As various applications may employ a display engine to render their output surfaces on a display, and the output surfaces may contain security-sensitive information, these output surfaces might need to be delivered to the display engine in a secure manner. Examples of such applications include banking applications where a browser may offload a part of a transaction to a graphics engine, antivirus applications where a part of the pattern matching may be offloaded to a graphics engine, and medical imaging.

In accordance with one or more aspects of the present disclosure, a processing system may comprise a processing core coupled to an architecturally protected memory. The processing core may comprise a control logic configured to prevent unauthorized access to the architecturally protected memory. The processing core may further comprise an execution logic configured to implement a secure enclave by executing instructions accessing data residing in the micro-architecturally protected memory, as described in more details herein below.

An application being executed within the secure enclave may generate a surface encryption key and then generate an output surface bitmap encrypted with the surface encryption key. The application may store an output surface bitmap in a memory accessible by the display engine. The application may then encrypt the surface encryption key with a key wrapping key, and employ a kernel mode driver to write the encrypted surface encryption key into a display engine register. The key wrapping key may be generated by the processor reset microcode, and can be written into a register of the display engine during the processor reset sequence execution.

The display engine may use the key wrapping key to decrypt the surface encryption key, and then use the latter to decrypt the surface bitmap to be rendered on display. Various aspects of the above referenced methods and systems are described in more details herein below by way of examples, rather than by way of limitation.

In the following description, numerous specific details are set forth, such as examples of specific types of processors and system configurations, specific hardware structures, specific architectural and micro architectural details, specific register configurations, specific instruction types, specific system components, specific measurements/heights, specific processor pipeline stages and operation in order to provide a thorough understanding of the present disclosure. It will be apparent, however, to one skilled in the art that these specific details need not be employed to practice the methods disclosed herein. In other instances, well known components or methods, such as specific and alternative processor architectures, specific logic circuits/code for described algorithms, specific firmware code, specific interconnect operation, specific logic configurations, specific manufacturing techniques and materials, specific compiler implementations, specific expression of algorithms in code, specific power down and gating techniques/logic and other specific operational details of computer system have not been described in detail in order to avoid unnecessarily obscuring the present disclosure.

Although the following examples are described with reference to a processor, other implementations are applicable to other types of integrated circuits and logic devices. Similar techniques and teachings of examples described herein can be applied to other types of circuits or semiconductor devices that can benefit from higher pipeline throughput and improved performance. The teachings of examples described herein are applicable to any processor or machine that performs data manipulations. However, the present disclosure is not limited to processors or machines that perform 512 bit, 256 bit, 128 bit, 64 bit, 32 bit, or 16 bit data operations and can be applied to any processor and machine in which manipulation or management of data is performed.

The examples illustrating the present disclosure and accompanied drawings should not be construed in a limiting sense as they are merely intended to provide examples of embodiments described herein rather than to provide an exhaustive list of all possible implementations of embodiments described herein. Although the below examples describe instruction handling and distribution in the context of execution units and logic circuits, other implementations of the systems and methods described herein can be accomplished by way of a data or instructions stored on a machine-readable, tangible medium, which when performed by a machine cause the machine to perform functions consistent with at least one embodiment described herein. In certain implementations, functions associated with embodiments described herein are embodied in machine-executable instructions. The instructions can be used to cause a general-purpose or special-purpose processor that is programmed with the instructions to perform the methods described herein. Implementations described herein may be provided as a computer program product or software which may include a machine or computer-readable medium having stored thereon instructions which may be used to program a computer (or other electronic devices) to perform one or more operations according to embodiments described herein. Alternatively, operations of systems and methods described herein may be performed by specific hardware components that contain fixed-function logic for performing the operations, or by any combination of programmed computer components and fixed-function hardware components.

Instructions used to program logic to perform the methods described herein can be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

"Processor" herein shall refer to a device capable of executing instructions encoding arithmetic, logical, or I/O operations. In one illustrative example, a processor may follow Von Neumann architectural model and may include an arithmetic logic unit (ALU), a control unit, and a plurality of registers. In a further aspect, a processor may include one or more processing cores, and hence may be a single core processor which is typically capable of processing a single instruction pipeline, or a multi-core processor which may simultaneously process multiple instruction pipelines. In another aspect, a processor may be implemented as a single integrated circuit, two or more integrated circuits, or may be a component of a multi-chip module (e.g., in which individual microprocessor dies are included in a single integrated circuit package and hence share a single socket).

Referring now to FIG. 1, shown is a block diagram of an example processing system in accordance with one or more aspects of the present disclosure. As shown in FIG. 1, processing system 100 may include one or more processing cores 111, each processing core 111 having a local first level (L1) cache 115 associated therewith. L1 cache 115 may be communicatively coupled to a shared last level cache (LLC) 120. In an illustrative example, the cache hierarchy comprising L1 cache 115 and LLC 120 may be configured as an inclusive cache hierarchy, such that at least part of the information stored in L1 cache 115 may also be stored in LLC 120.

Figure 6:
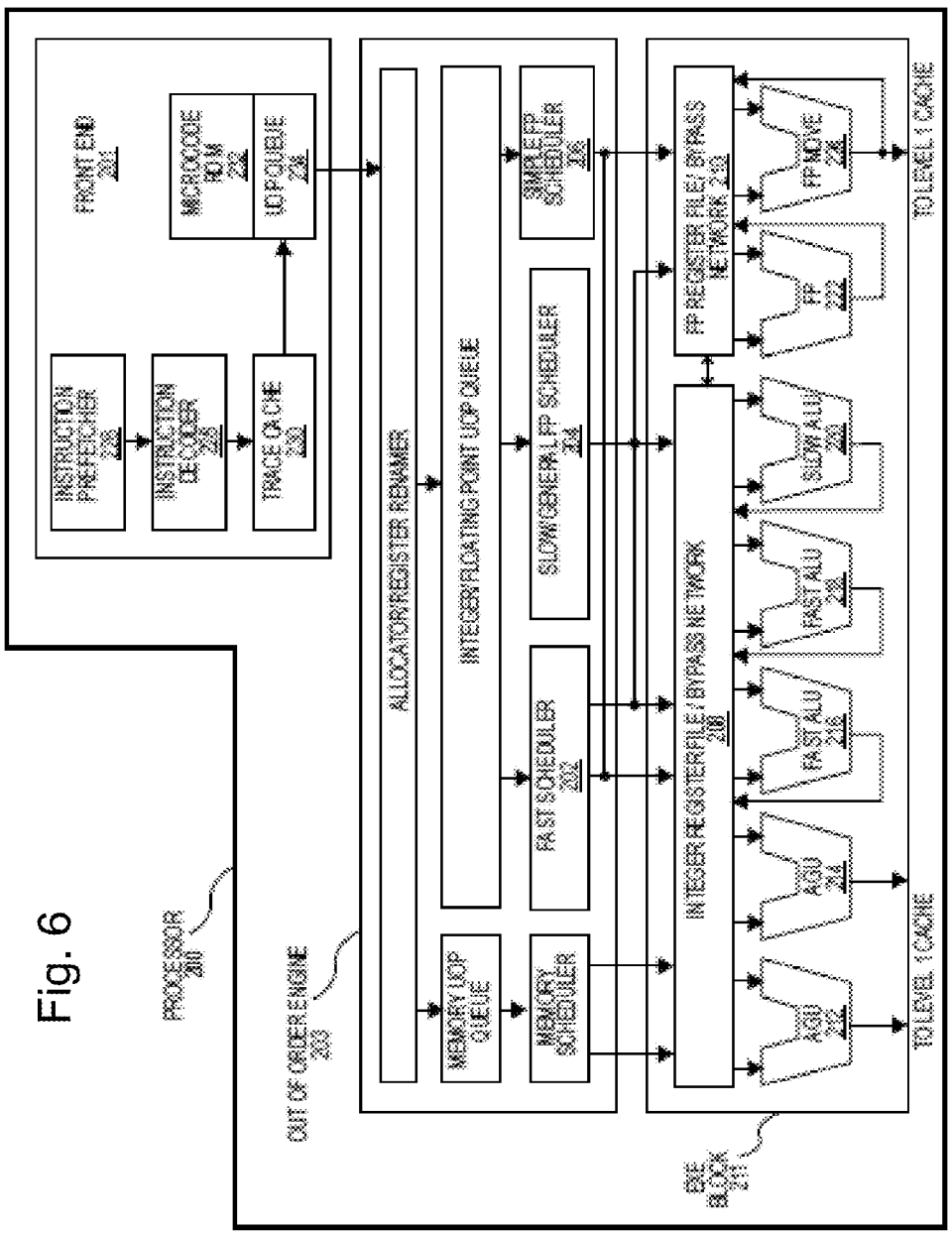
FIG. 6 depicts a block diagram of a processor, in accordance with one or more aspects of the present disclosure.
Figure 7:
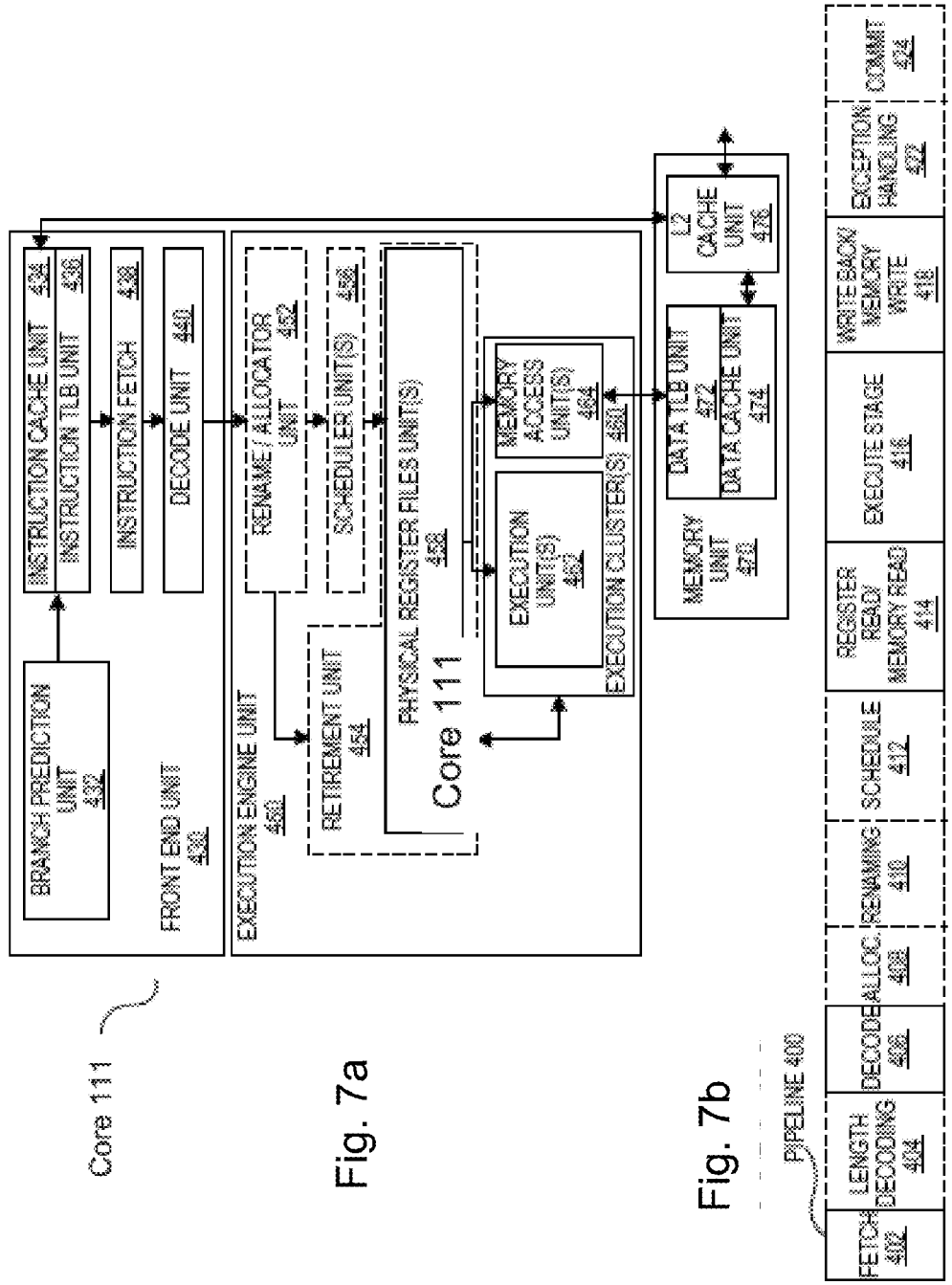
FIGS. 7a-7b schematically illustrates elements of a processor micro-architecture, in accordance with one or more aspects of the present disclosure.

Processing cores 111 in various implementations may be provided by in-order cores or out-or-order cores. In an illustrative example, processing core 111 may have a micro-architecture including processor logic and circuits used to implement an instruction set architecture (ISA). Processors with different micro-architectures can share at least a portion of a common instruction set. For example, the same register architecture of the ISA may be implemented in different ways in different micro-architectures using various techniques, including dedicated physical registers, one or more dynamically allocated physical registers using a register renaming mechanism (e.g., the use of a register alias table (RAT), a reorder buffer (ROB) and a retirement register file), as illustrated by FIGS. 6-7. In certain implementations, processing system 100 may also include various other components not shown in FIG. 1.

In accordance with one or more aspects of the present disclosure, processing system 100 may further comprise an architecturally protected memory, which in certain implementations may be provided by an enclave page cache (EPC). Processing core 111 may comprise a processing logic configured to implement a secure enclave by executing instructions residing in the protected memory and accessing data residing in the protected memory, while preventing unauthorized access to the protected memory, as described in more details herein below.

"Secure enclave" herein shall refer to a protected sequence of operations accessing a memory protected at the micro-architectural level. Encryption is used to protect the integrity of an active enclave.

An active secure enclave may be divided into an encrypted portion and a decrypted portion. The encrypted portion may reside in an unprotected memory (such as main memory or disk). The decrypted portion resides in the enclave page cache (EPC) 182. The EPC is a secure storage used by the processing system to temporarily store enclave pages when they are not cryptographically protected. Any accesses to the enclave memory pages loaded into the EPC are protected from any modification by software entities outside that enclave. Furthermore, unauthorized parties will not be able to read or modify plain-text data belonging to enclaves that is loaded into the EPC via straight-forward hardware attacks. The EPC is located within the physical address space of the processing system, but can only be accessed using privileged or non-privileged enclave instructions used to build and enable an enclave, enter/exit the enclave, manage EPC, and perform various other operations.

There are several mechanisms of implementing the EPC. The EPC may be implemented as on on-die SRAM or eDRAM. Alternatively, the EPC may be constructed by sequestering ways of the CPU's last-level cache. Another mechanism of implementing EPC is the Crypto Memory Aperture (CMA). The CMA provides a mechanism of creating a cryptographically protected volatile storage using the platform dynamic random access memory (DRAM). Various agents may be employed to recognize the memory accesses going to the CMA, and to route those accesses to a cryptographic controller located in the processor. The cryptographic controller, depending on the desired protection level, may generate one or more memory accesses to the platform DRAM to fetch the cipher-text, processes the cipher-text to generate the plain-text, and satisfy the original CMA memory request.

Referring again to FIG. 1, L1 cache 115 can transfer data to and from the LLC 120. Memory controller 150 can be connected to the last level cache 120 and attach to the crypto engine 152. Memory controller 150 can assess CMA 180 residing on backing storage device 186 within physical address space 188. CMA 180 may comprise EPC 182 and EPC map 184. The EPC, EPC map, and various other implementation-specific data structures may be mapped to locations inside the CMA. When a request to access the EPC is generated, CMA may remap the request to the backing storage location containing encrypted EPC data, and retrieve the data.

Various enclave-related functions may be implemented in the microcode, supported by the hardware implementations of CMA and the processing logic implementing the enclave functionality. In certain implementations, the processing logic may control access to EPC 182 via TLB 164 and a page miss handler (PMH) 168.

In an illustrative example, a TLB may be implemented as a table mapping virtual addresses to physical addresses. "TLB hit" refers to a situation when a requested virtual address is present in the TLB. "TLB miss" refers to the opposite situation: when the requested virtual address is not present in the TLB, the address translation may proceed by looking up the page table. After the physical address is determined, the virtual address to physical address mapping may be entered into the TLB.

Each TLB entry may include one or more bits indicating identifying the enclave owning the memory location referenced by the TLB entry. Alternatively, if these bits are not provided, a TLB flush will be needed when exiting the secure enclave to prevent unauthorized access to the EPC. In an illustrative example, if a TLB miss occurs, an extra lookup may fetch data from the EPC map on multiple memory references. The PMH may perform the look up of the EPC map.

Figure 2:
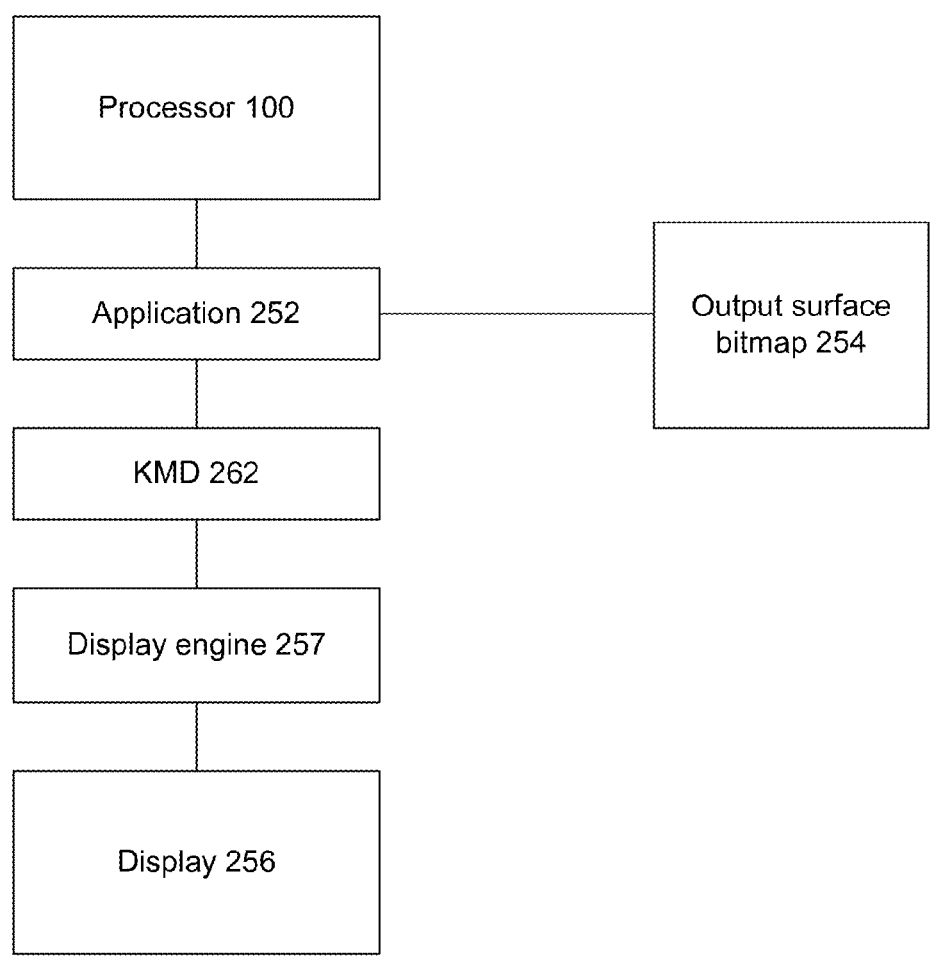
FIG. 2 schematically illustrates a video output subsystem communicatively coupled to an example processing system, in accordance with one or more aspects of the present disclosure.

In various implementations, processing system 100 may be incorporated into a computer system comprising one or more video display devices. In an illustrative example, schematically illustrated by FIG. 2, an application 252 being executed within a secure enclave may generate an output surface bitmap 254 to be rendered on a video display device 256 communicatively coupled to processing system 100 via a display engine 257 (which may also be referred to as a "video controller" or "graphic adapter"). A kernel mode driver 262 may be executed in Ring 0 to facilitate communications between applications executing in Ring 3 and display engine 257.

In accordance with one or more aspects of the present disclosure, the application may generate a surface encryption key and then generate an output surface encrypted with the surface encryption key. The application may then encrypt the surface encryption key with a key wrapping key, and write the encrypted surface encryption key into a display engine register. The key wrapping key may be generated by the processor reset microcode, and can be written into the display engine register during the processor reset sequence execution. The display engine may use the key wrapping key to decrypt the surface encryption key, and then use the latter to decrypt the surface bitmap to be rendered on display.

The key wrapping key may by generated by the processor reset microcode, and may be stored in a register within the display engine during the processor reset sequence execution. The key wrapping key may be provided by a sequence of bits having a pre-determined or configurable length. In an illustrative example, a random number generating method may be employed for generating the key wrapping key. Generating the key wrapping key may be implemented in software, hardware, or any combination thereof.

Figure 3:
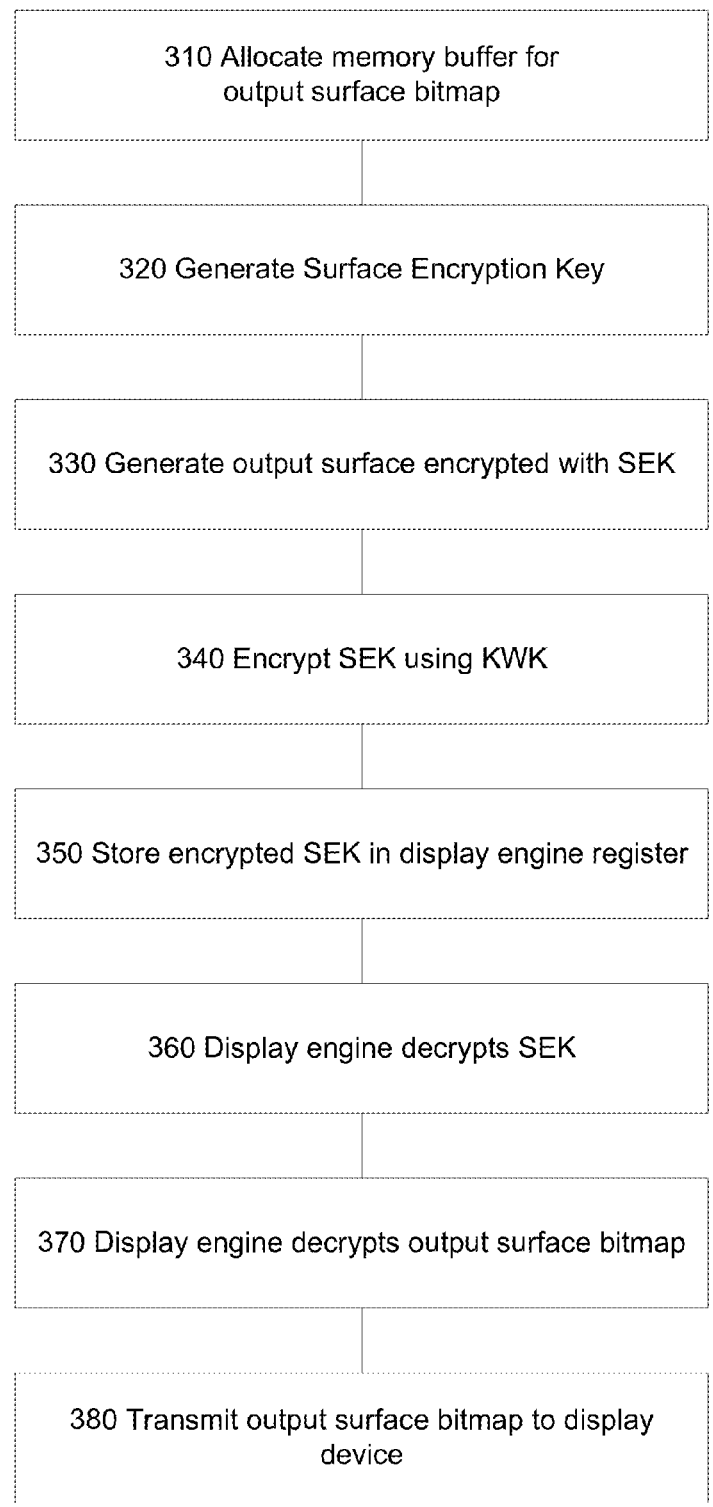
FIG. 3 depicts a flow diagram of an example method for secure delivery of output surface bitmaps to the display engine, in accordance with one or more aspects of the present disclosure.

FIG. 3 depicts a flow diagram of an example method for secure delivery of output surface bitmaps to a display engine, in accordance with one or more aspects of the present disclosure. Method 300 may be performed by a computer system that may comprise hardware (e.g., circuitry, dedicated logic, and/or programmable logic), software (e.g., instructions executable on a computer system to perform hardware simulation), or a combination thereof. Method 300 and/or each of its functions, routines, subroutines, or operations may be performed by one or more physical processors of the computer system executing the method. Two or more functions, routines, subroutines, or operations of method 300 may be performed in parallel or in an order which may differ from the order described above. In certain implementations, method 300 may be performed by a single processing thread. Alternatively, method 300 may be performed by two or more processing threads, each thread executing one or more individual functions, routines, subroutines, or operations of the method. In an illustrative example, the processing threads implementing method 300 may be synchronized (e.g., using semaphores, critical sections, and/or other thread synchronization mechanisms). Alternatively, the processing threads implementing method 300 may be executed asynchronously with respect to each other. In one example, as illustrated by FIG. 3, method 300 may be performed by the computer systems described herein below and illustrated by FIGS. 5-11.

Referring to FIG. 3, at block 310, an application being executed within an architecturally protected execution environment of a processing system allocate one or more memory buffers for storing encrypted output surface bitmaps. Depending upon the screen resolution, the buffers may be relatively large (e.g., for a 4 M×4 M surface in RGBA format, the surface bitmap size is 64 MB). As the buffers are intended for storing encrypted bitmaps, they need not be allocated within an architecturally protected memory (such as EPC), and thus may be allocated within the platform DRAM.

In certain implementations, the protected execution environment may comprise one or more memory pages protected at the micro-architectural level. In an illustrative example, the micro-architecturally protected execution environment may be provided by a secure enclave.

At block 320, the application may generate a surface encryption key. In an illustrative example, the surface encryption key may be generated using RDRAND instruction returning random numbers from an on-chip random number generator. In certain implementations, the random number generator may be compliant with various security and cryptographic standards such as NIST SP800-90, FIPS 140-2, and ANSI X9.82. Since the surface encryption key is generated inside the secure enclave, it resides in the EPC, and thus is protected from tampering.

At block 330, the application may generate an output surface bitmap encrypted with the surface encryption key. The encryption method employed to encrypt the output surface bitmap may be implementation-specific, including software-only, hardware-only, and hardware-assisted software implementations. The encrypted output surface bitmap may be stored in the previously allocated memory buffers, as described with references to block 310 herein above.

At block 340, the application may encrypt the surface encryption key using the key wrapping key. In certain implementations, the surface encryption key may be encrypted and bound to a policy specifying the interfaces which may be employed by the display engine for rendering the output surfaces encrypted with the surface encryption key.

In an illustrative example, a new instruction, EBIND, may implemented for encrypting a key and binding it to a policy. The encrypted blob may only be decrypted by the display engine using the key wrapping key. In certain implementations, producing an encrypted key by EBIND instructions and binding the encrypted key to a policy as described herein, may be employed for performing a key exchange between a processor and various external devices, including, e.g., input/output devices.

The encrypted key may be produced by the EBIND instruction based on the input BIND_STRUCT structure specified as an input parameter for the instruction: EBIND BIND_STRUCT. The BIND_STRUCT structure may comprise a target device identifier, a target security version number, a target device policy, a surface encryption key to be encrypted, and/or various other fields as schematically illustrated by FIG. 4.

The target device policy specifying the allowed interfaces for rendering the output surfaces may be provided by a bit sequence. Various types of interfaces may be assigned fixed positions within the bit sequence encoding the policy, wherein a set bit may indicate that the corresponding interface is allowed, while a zero bit may indicate that the corresponding interface is not allowed for rendering the output surfaces encrypted with the surface encryption key to which the policy is bound. Various types of interfaces specified by the policy may include, e.g., integrated interfaces (such as a screen integrated into a laptop, a cell phone, or a tablet computer), memory-based interfaces (such as WIDI or USB interfaces), and/or HDMI interfaces with or without HDCP support.

Referring again to FIG. 3, at block 350, the application may invoke a kernel mode driver to store the encrypted surface encryption key in a display engine register, and to signal the display engine that a surface bitmap is ready for rendering At block 360, the display engine may decrypt the surface encryption key using the key wrapping key that has been programmed during the processor reset sequence as described in more details herein above. In order to minimize the hardware complexity of the display engine, the cryptographic hardware logic needed to implement the key wrapping methods described herein does not necessarily need to reside in the display engine. In certain implementations, the cryptographic hardware can be implemented by other system component, e.g., by the processor. Responsive to receiving an encrypted surface encryption key, a display engine may transmit the blob comprising the encrypted key to a cryptographic functional unit implemented by another system component. The cryptographic functional unit may unwrap the key and return it to the display engine.

At block 370, the display engine may decrypt one or more output surface bitmaps using the surface encryption key.

At block 380, the display engine may transmit the output surface bitmap to a display device. The bit stream being transmitted from the display engine to the display device may be encrypted using HDCP (High-bandwidth Digital Content Protection) protocol.

To ensure that HDCP encryption would not be disabled during a protected display session, the display engine may implement a security policy in accordance to which the display device hardware would destroy the encryption/decryption key responsive to detecting an attempted configuration change.

In certain implementations, the security policy may further associate an expiration time with a surface encryption key being stored by the display engine. Upon expiration of a pre-defined or dynamically configurable key expiration period, the display engine may destroy the key and request a new key from the secure application. The security policy may further require the display engine to implement a configuration freeze, to ensure that the display engine configuration would not be changed during a protected display session.

One or more security policy parameters can be communicated to the display engine along with the encrypted surface encryption key. Upon completing the operations schematically described by block 380, the method may terminate.

Thus, the systems and methods described herein provide end-to-end security for applications being executed within protected execution environments (such as secure enclaves) and rendering their output on display devices. While the description herein references a display engine, the systems and methods described herein may also be used with other functional graphic units.

While the description herein references a single protected display session, the systems and methods described herein may also be used to support multiple concurrent protected sessions, based on the number of concurrent overlays supported by the display engine. The display engine may be configured to maintain several registers for storing a separate surface encryption key for every output surface of two or more concurrent output surfaces supported by the display engine.

While for various use cases confidentiality of the output surfaces may be sufficient, other use cases may also require a protection against a replay attack, i.e., against an attempt to maliciously repeat a valid encrypted surface bitmap transmission. To implement the replay protection, a secure application may generate the surface encryption key for every surface output bitmap to be displayed, by a applying a key derivation function to a random number value and a surface counter:

$$SEK=KeyFn(RDRAND,counter),$$

wherein SEK is the surface encryption key;
RDRAND is a random number (produced, e.g., by RDRAND instruction); and
counter is the surface counter maintained locally by the application and incremented every time an output surface has been generated and encrypted.

The generated key may be used by the secure application to encrypt the output surface bitmap to be stored in a memory buffer accessible by the display engine, as described in more details herein above with references to block 330 of FIG. 3. The secure application may then encrypt the RDRAND value using the key wrapping key and store the encrypted blob in a display engine register, as described in more details herein above with references to block 330 of FIG. 3. Upon receiving the encrypted blob, the display engine may decrypt the RDRAND value. The display engine may then generate the surface encryption key by a applying the key derivation function to the RDRAND value and a locally maintained surface counter. The latter may be maintained by the display engine and incremented each time a surface output bitmap has been decrypted and transmitted to a display device.

The monotonically increasing surface counter maintained by the display engine ensures that an attacker cannot replay output surfaces. If an attacker replays a previously displayed output surface, the value of the surface counter in the display engine will not match the value of the counter that was used by the secure application to generate the surface encryption key for the output surface bitmap. Hence, the surface encryption key generated by the display engine will be different from the key that was used to encrypt the surface, resulting in displaying a set of pixels that does not convey any information, thus effectively preventing the attempted replay attack.

In certain implementations, to provide the means for the display engine to detect a possible de-synchronization between the surface counters maintained by the secure application and by the display engine, the secure application may employ the kernel mode driver to transmit the counter value to the display engine. The display engine may compare the received counter value with the value of the locally maintained surface counter, and only decrypt and display the output surface bitmap if the two counter values match.

Although various systems and methods are described herein with reference to specific integrated circuits, such as processors, other implementations may be applicable to other types of integrated circuits and logic devices. Techniques and teachings of systems and methods described herein may be applied to other types of circuits or semiconductor devices that may also benefit from better energy efficiency and energy conservation. For example, the disclosed implementations are not limited to any particular type of computer systems, and may be also used in other devices, such as handheld devices, systems on chip (SoCs), and embedded applications. Some examples of handheld devices include cellular phones, Internet protocol devices, digital cameras, personal digital assistants (PDAs), and handheld PCs. Embedded applications may include a microcontroller, a digital signal processor (DSP), network computers (NetPC), set-top boxes, network hubs, wide area network (WAN) switches, or any other system that can perform the functions and operations taught below. Moreover, the systems and methods described herein are not limited to physical computing devices, but may also relate to software-implemented methods. Power savings realized by systems and methods described herein may be independent of and complementary to an operating system (OS)-based mechanism, such as the Advanced Configuration and Platform Interface (ACPI) standard.

The methods and systems described herein above may be implemented by computer system of various architectures, designs and configurations for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable to implement the methods described herein. In general, a large variety of systems or electronic devices capable of incorporating a processor and/or other execution logic as disclosed herein are generally suitable for implementing the systems and methods described herein.

Figure 5:
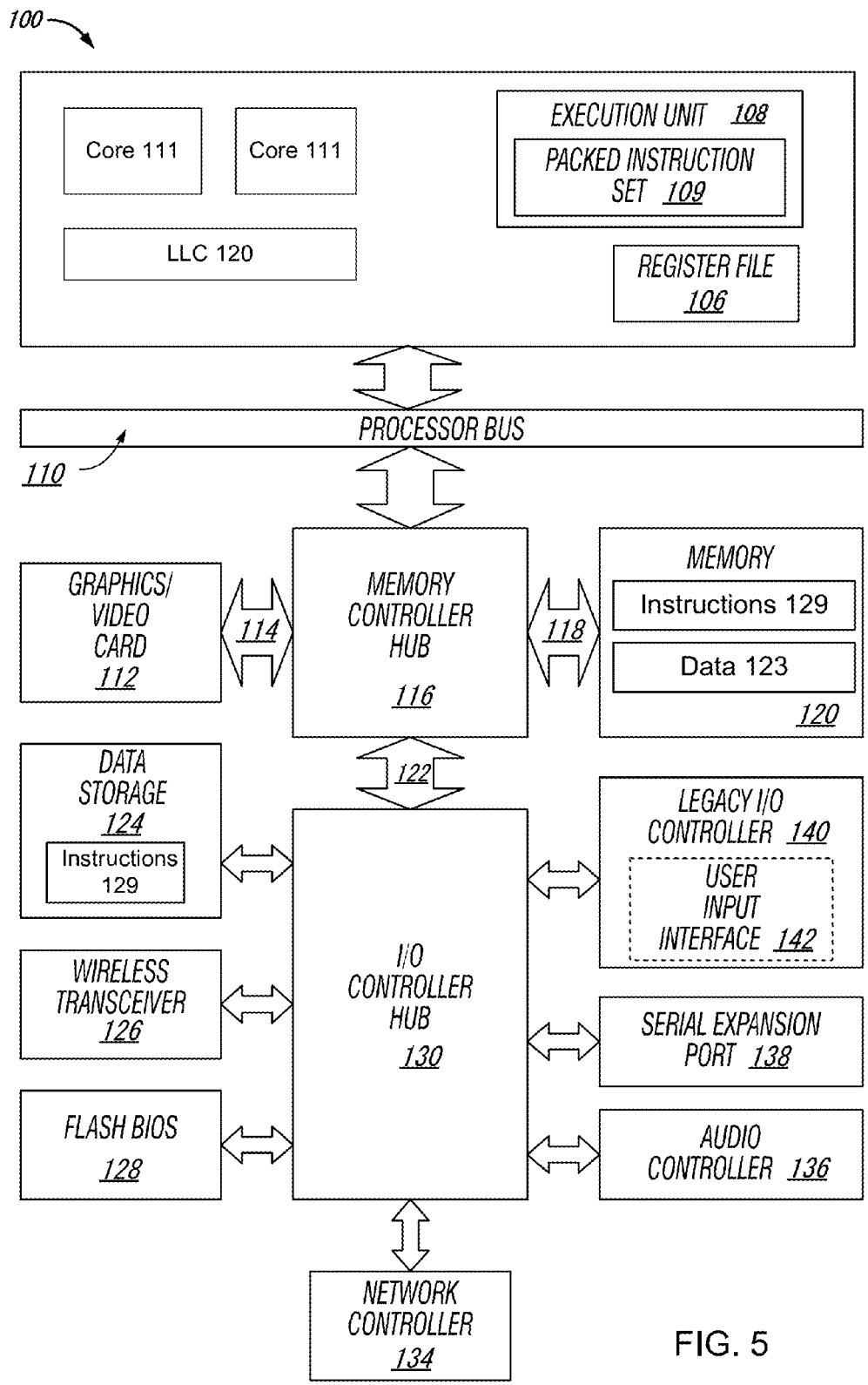
FIG. 5 depicts a high-level component diagram of an example computer system, in accordance with one or more aspects of the present disclosure.

FIG. 5 depicts a high-level component diagram of one example of a computer system in accordance with one or more aspects of the present disclosure. A computer system 100 may include a processor 110 to employ execution units including logic to perform algorithms for processing data, in accordance with the embodiment described herein. System 100 is representative of processing systems based on the PENTIUM III™, PENTIUM 4™, Xeon™, Itanium, XScale™ and/or StrongARM™ microprocessors available from Intel Corporation of Santa Clara, Calif., although other systems (including PCs having other microprocessors, engineering workstations, set-top boxes and the like) may also be used. In one embodiment, sample system 100 executes a version of the WINDOWS™ operating system available from Microsoft Corporation of Redmond, Wash., although other operating systems (UNIX and Linux for example), embedded software, and/or graphical user interfaces, may also be used. Thus, embodiments described herein are not limited to any specific combination of hardware circuitry and software.

In an illustrative example, processor 110 includes one or more execution units 108 to implement an algorithm that is to perform at least one instruction. One embodiment may be described in the context of a single processor desktop or server system, but alternative embodiments may be included in a multiprocessor system. System 100 is an example of a 'hub' system architecture. The computer system 100 includes a processor 110 to process data signals. The processor 110, as one illustrative example, includes a complex instruction set computer (CISC) microprocessor, a reduced instruction set computing (RISC) microprocessor, a very long instruction word (VLIW) microprocessor, a processor implementing a combination of instruction sets, or any other processor device, such as a digital signal processor, for example. The processor 110 is coupled to a processor bus 110 that transmits data signals between the processor 110 and other components in the system 100. The elements of system 100 (e.g. graphics accelerator 112, memory controller hub 116, memory 120, I/O controller hub 124, wireless transceiver 126, Flash BIOS 128, Network controller 134, Audio controller 136, Serial expansion port 138, I/O controller 140, etc.) perform their conventional functions that are well known to those familiar with the art.

In one embodiment, the processor 110 includes a Level 1 (L1) internal cache. Depending on the architecture, the processor 110 may have a single internal cache or multiple levels of internal caches. Other embodiments include a combination of both internal and external caches depending on the particular implementation and needs. Register file 106 is to store different types of data in various registers including integer registers, floating point registers, vector registers, banked registers, shadow registers, checkpoint registers, status registers, and instruction pointer register.

Execution unit 108, including logic to perform integer and floating point operations, also resides in the processor 110. The processor 110, in one embodiment, includes a microcode (ucode) ROM to store microcode, which when executed, is to perform algorithms for certain macroinstructions or handle complex scenarios. Here, microcode is potentially updateable to handle logic bugs/fixes for processor 110. For one embodiment, execution unit 108 includes logic to handle a packed instruction set 109. By including the packed instruction set 109 in the instruction set of a general-purpose processor 110, along with associated circuitry to execute the instructions, the operations used by many multimedia applications may be performed using packed data in a general-purpose processor 110. Thus, many multimedia applications are accelerated and executed more efficiently by using the full width of a processor's data bus for performing operations on packed data. This potentially eliminates the need to transfer smaller units of data across the processor's data bus to perform one or more operations, one data element at a time. Alternate embodiments of an execution unit 108 may also be used in micro controllers, embedded processors, graphics devices, DSPs, and other types of logic circuits. In certain implementations, the processor 110 may further include a cache control logic 124, the functioning of which is described in more details herein below.

System 100 includes a memory 120. Memory 120 includes a dynamic random access memory (DRAM) device, a static random access memory (SRAM) device, flash memory device, or other memory device. Memory 120 stores instructions 129 and/or data 123 represented by data signals that are to be executed by the processor 110. In certain implementations, instructions 129 may include instructions employing the cache control logic 124 for managing shared cache, as described in more details herein below.

A system logic chip 116 is coupled to the processor bus 110 and memory 120. The system logic chip 116 in the illustrated embodiment is a memory controller hub (MCH). The processor 110 can communicate to the MCH 116 via a processor bus 110. The MCH 116 provides a high bandwidth memory path 118 to memory 120 for instruction and data storage and for storage of graphics commands, data and textures. The MCH 116 is to direct data signals between the processor 110, memory 120, and other components in the system 100 and to bridge the data signals between processor bus 110, memory 120, and system I/O 122. In some embodiments, the system logic chip 116 can provide a graphics port for coupling to a graphics controller 112. The MCH 116 is coupled to memory 120 through a memory interface 118. The graphics card 112 is coupled to the MCH 116 through an Accelerated Graphics Port (AGP) interconnect 114.

System 100 uses a proprietary hub interface bus 122 to couple the MCH 116 to the I/O controller hub (ICH) 130. The ICH 130 provides direct connections to some I/O devices via a local I/O bus. The local I/O bus is a high-speed I/O bus for connecting peripherals to the memory 120, chipset, and processor 110. Some examples are the audio controller, firmware hub (flash BIOS) 128, wireless transceiver 126, data storage 124, legacy I/O controller containing user input and keyboard interfaces, a serial expansion port such as Universal Serial Bus (USB), and a network controller 134. The data storage device 124 can comprise a hard disk drive, a floppy disk drive, a CD-ROM device, a flash memory device, or other mass storage device.

For another embodiment of a system, an instruction in accordance with one embodiment can be used with a system on a chip. One embodiment of a system on a chip comprises of a processor and a memory. The memory for one such system is a flash memory. The flash memory can be located on the same die as the processor and other system components. Additionally, other logic blocks such as a memory controller or graphics controller can also be located on a system on a chip.

FIG. 6 is a block diagram of the micro-architecture for a processor 200 that includes logic circuits to perform instructions in accordance with one or more aspects of the present disclosure. In some embodiments, an instruction in accordance with one embodiment can be implemented to operate on data elements having sizes of byte, word, doubleword, quadword, etc., as well as datatypes, such as single and double precision integer and floating point datatypes. In one embodiment the in-order front end 201 is the part of the processor 200 that fetches instructions to be executed and prepares them to be used later in the processor pipeline. The front end 201 may include several units. In one embodiment, the instruction prefetcher 226 fetches instructions from memory and feeds them to an instruction decoder 228 which in turn decodes or interprets them. For example, in one embodiment, the decoder decodes a received instruction into one or more operations called "micro-instructions" or "micro-operations" (also referred to as uops) that the machine can execute. In other embodiments, the decoder parses the instruction into an opcode and corresponding data and control fields that are used by the micro-architecture to perform operations in accordance with one embodiment. In one embodiment, the trace cache 230 takes decoded uops and assembles them into program ordered sequences or traces in the uop queue 234 for execution. When the trace cache 230 encounters a complex instruction, the microcode ROM 232 provides the uops needed to complete the operation.

Some instructions are converted into a single micro-op, whereas others need several micro-ops to complete the full operation. In one embodiment, if more than four micro-ops are needed to complete an instruction, the decoder 228 accesses the microcode ROM 232 to do the instruction. For one embodiment, an instruction can be decoded into a small number of micro ops for processing at the instruction decoder 228. In another embodiment, an instruction can be stored within the microcode ROM 232 should a number of micro-ops be needed to accomplish the operation. The trace cache 230 refers to an entry point programmable logic array (PLA) to determine a correct micro-instruction pointer for reading the micro-code sequences to complete one or more instructions in accordance with one embodiment from the micro-code ROM 232. After the microcode ROM 232 finishes sequencing micro-ops for an instruction, the front end 201 of the machine resumes fetching micro-ops from the trace cache 230.

The out-of-order execution engine 203 is where the instructions are prepared for execution. The out-of-order execution logic has a number of buffers to smooth out and re-order the flow of instructions to optimize performance as they go down the pipeline and get scheduled for execution. The allocator logic allocates the machine buffers and resources that each uop needs in order to execute. The register aliasing logic maps logical registers onto entries in a register file. The allocator also allocates an entry for each uop in one of the two uop queues, one for memory operations and one for non-memory operations, in front of the instruction schedulers: memory scheduler, fast scheduler 202, slow/general floating point scheduler 204, and simple floating point scheduler 206. The uop schedulers 202, 204, 206 determine when a uop is ready to execute based on the readiness of their dependent input register operand sources and the availability of the execution resources the uops need to complete their operation. The fast scheduler 202 of one embodiment can schedule on each half of the main clock cycle while the other schedulers can schedule once per main processor clock cycle. The schedulers arbitrate for the dispatch ports to schedule uops for execution.

Physical register files 208, 210 sit between the schedulers 202, 204, 206, and the execution units 212, 214, 216, 218, 220, 222, 224 in the execution block 211. There is a separate register file 208, 210 for integer and floating point operations, respectively. Each register file 208, 210, of one embodiment also includes a bypass network that can bypass or forward just completed results that have not yet been written into the register file to new dependent uops. The integer register file 208 and the floating point register file 210 are also capable of communicating data with the other. For one embodiment, the integer register file 208 is split into two separate register files, one register file for the low order 32 bits of data and a second register file for the high order 32 bits of data. The floating point register file 210 of one embodiment has 128 bit wide entries because floating point instructions typically have operands from 64 to 128 bits in width.

The execution block 211 contains the execution units 212, 214, 216, 218, 220, 222, 224, where the instructions are actually executed. This section includes the register files 208, 210, that store the integer and floating point data operand values that the micro-instructions need to execute. The processor 200 of one embodiment is comprised of a number of execution units: address generation unit (AGU) 212, AGU 214, fast ALU 216, fast ALU 218, slow ALU 220, floating point ALU 222, floating point move unit 224. For one embodiment, the floating point execution blocks 222, 224, execute floating point, MMX, SIMD, and SSE, or other operations. The floating point ALU 222 of one embodiment includes a 64 bit by 64 bit floating point divider to execute divide, square root, and remainder micro-ops. For systems and methods described herein, instructions involving a floating point value may be handled with the floating point hardware. In one embodiment, the ALU operations go to the high-speed ALU execution units 216, 218. The fast ALUs 216, 218, of one embodiment can execute fast operations with an effective latency of half a clock cycle. For one embodiment, most complex integer operations go to the slow ALU 220 as the slow ALU 220 includes integer execution hardware for long latency type of operations, such as a multiplier, shifts, flag logic, and branch processing. Memory load/store operations are executed by the AGUs 212, 214. For one embodiment, the integer ALUs 216, 218, 220 are described in the context of performing integer operations on 64 bit data operands. In alternative embodiments, the ALUs 216, 218, 220 can be implemented to support a variety of data bits including 16, 32, 128, 256, etc. Similarly, the floating point units 222, 224 can be implemented to support a range of operands having bits of various widths. For one embodiment, the floating point units 222, 224 can operate on 128 bits wide packed data operands in conjunction with SIMD and multimedia instructions.

In one embodiment, the uops schedulers 202, 204, 206 dispatch dependent operations before the parent load has finished executing. As uops are speculatively scheduled and executed in processor 200, the processor 200 also includes logic to handle memory misses. If a data load misses in the data cache, there can be dependent operations in flight in the pipeline that have left the scheduler with temporarily incorrect data. A replay mechanism tracks and re-executes instructions that use incorrect data. The dependent operations should be replayed and the independent ones are allowed to complete. The schedulers and replay mechanism of one embodiment of a processor are also designed to catch instruction sequences for text string comparison operations.

The term "registers" may refer to the on-board processor storage locations that are used as part of instructions to identify operands. In other words, registers may be those that are usable from the outside of the processor (from a programmer's perspective). However, the registers of an embodiment should not be limited in meaning to a particular type of circuit. Rather, a register of an embodiment is capable of storing and providing data, and performing the functions described herein. The registers described herein can be implemented by circuitry within a processor using any number of different techniques, such as dedicated physical registers, dynamically allocated physical registers using register aliasing, combinations of dedicated and dynamically allocated physical registers, etc. In one embodiment, integer registers store thirty-two bit integer data. A register file of one embodiment also contains eight multimedia SIMD registers for packed data. For the discussions below, the registers are understood to be data registers designed to hold packed data, such as 64 bits wide MMX registers (also referred to as 'mm' registers in some instances) in microprocessors enabled with the MMX™ technology from Intel Corporation of Santa Clara, Calif. These MMX registers, available in both integer and floating point forms, can operate with packed data elements that accompany SIMD and SSE instructions. Similarly, 128 bits wide XMM registers relating to SSE2, SSE3, SSE4, or beyond (referred to generically as "SSEx") technology can also be used to hold such packed data operands. In one embodiment, in storing packed data and integer data, the registers do not need to differentiate between the two data types. In one embodiment, integer and floating point are either contained in the same register file or different register files. Furthermore, in one embodiment, floating point and integer data may be stored in different registers or the same registers.

FIGS. 7a-7b schematically illustrates elements of a processor micro-architecture, in accordance with one or more aspects of the present disclosure. In FIG. 7a, a processor pipeline 400 includes a fetch stage 402, a length decode stage 404, a decode stage 406, an allocation stage 408, a renaming stage 410, a scheduling (also known as a dispatch or issue) stage 412, a register read/memory read stage 414, an execute stage 416, a write back/memory write stage 418, an exception handling stage 422, and a commit stage 424.

In FIG. 7b, arrows denote a coupling between two or more units and the direction of the arrow indicates a direction of data flow between those units. FIG. 7b shows processor core 111 including a front end unit 430 coupled to an execution engine unit 450, and both are coupled to a memory unit 470.

The core 111 may be a reduced instruction set computing (RISC) core, a complex instruction set computing (CISC) core, a very long instruction word (VLIW) core, or a hybrid or alternative core type. As yet another option, the core 111 may be a special-purpose core, such as, for example, a network or communication core, compression engine, graphics core, or the like.

The front end unit 430 includes a branch prediction unit 432 coupled to an instruction cache unit 434, which is coupled to an instruction translation lookaside buffer (TLB) 436, which is coupled to an instruction fetch unit 438, which is coupled to a decode unit 440. The decode unit or decoder may decode instructions, and generate as an output one or more micro-operations, micro-code entry points, microinstructions, other instructions, or other control signals, which are decoded from, or which otherwise reflect, or are derived from, the original instructions. The decoder may be implemented using various different mechanisms. Examples of suitable mechanisms include, but are not limited to, look-up tables, hardware implementations, programmable logic arrays (PLAs), microcode read only memories (ROMs), etc. The instruction cache unit 434 is further coupled to a level 2 (L2) cache unit 476 in the memory unit 470. The decode unit 440 is coupled to a rename/allocator unit 452 in the execution engine unit 450.

The execution engine unit 450 includes the rename/allocator unit 452 coupled to a retirement unit 454 and a set of one or more scheduler unit(s) 456. The scheduler unit(s) 456 represents any number of different schedulers, including reservations stations, central instruction window, etc. The scheduler unit(s) 456 is coupled to the physical register file(s) unit(s) 458. Each of the physical register file(s) units 458 represents one or more physical register files, different ones of which store one or more different data types, such as scalar integer, scalar floating point, packed integer, packed floating point, vector integer, vector floating point, etc., status (e.g., an instruction pointer that is the address of the next instruction to be executed), etc. The physical register file(s) unit(s) 458 is overlapped by the retirement unit 454 to illustrate various ways in which register aliasing and out-of-order execution may be implemented (e.g., using a reorder buffer(s) and a retirement register file(s), using a future file(s), a history buffer(s), and a retirement register file(s); using a register maps and a pool of registers; etc.). Generally, the architectural registers are visible from the outside of the processor or from a programmer's perspective. The registers are not limited to any known particular type of circuit. Various different types of registers are suitable as long as they are capable of storing and providing data as described herein. Examples of suitable registers include, but are not limited to, dedicated physical registers, dynamically allocated physical registers using register aliasing, combinations of dedicated and dynamically allocated physical registers, etc. The retirement unit 454 and the physical register file(s) unit(s) 458 are coupled to the execution cluster(s) 460. The execution cluster(s) 460 includes a set of one or more execution units 162 and a set of one or more memory access units 464. The execution units 462 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include one execution unit or multiple execution units that all perform all functions. The scheduler unit(s) 456, physical register file(s) unit(s) 458, and execution cluster(s) 460 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which the execution cluster of this pipeline has the memory access unit(s) 464). It should also be understood that where separate pipelines are used, one or more of these pipelines may be out-of-order issue/execution and the rest in-order.

The set of memory access units 464 is coupled to the memory unit 470, which includes a data TLB unit 472 coupled to a data cache unit 474 coupled to a level 2 (L2) cache unit 476. In one exemplary embodiment, the memory access units 464 may include a load unit, a store address unit, and a store data unit, each of which is coupled to the data TLB unit 472 in the memory unit 470. The L2 cache unit 476 is coupled to one or more other levels of cache and eventually to a main memory.

By way of example, the exemplary register aliasing, out-of-order issue/execution core architecture may implement the pipeline 400 as follows: the instruction fetch 438 performs the fetch and length decoding stages 402 and 404; the decode unit 440 performs the decode stage 406; the rename/allocator unit 452 performs the allocation stage 408 and renaming stage 410; the scheduler unit(s) 456 performs the schedule stage 412; the physical register file(s) unit(s) 458 and the memory unit 470 perform the register read/memory read stage 414; the execution cluster 460 perform the execute stage 416; the memory unit 470 and the physical register file(s) unit(s) 458 perform the write back/memory write stage 418; various units may be involved in the exception handling stage 422; and the retirement unit 454 and the physical register file(s) unit(s) 458 perform the commit stage 424.

The core 111 may support one or more instructions sets (e.g., the x86 instruction set (with some extensions that have been added with newer versions); the MIPS instruction set of MIPS Technologies of Sunnyvale, Calif.; the ARM instruction set (with additional extensions such as NEON) of ARM Holdings of Sunnyvale, Calif.).

In certain implementations, the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register aliasing is described in the context of out-of-order execution, it should be understood that register aliasing may be used in an in-order architecture. While the illustrated embodiment of the processor also includes a separate instruction and data cache units 434/474 and a shared L2 cache unit 476, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

In certain implementations, processor core 111 may be designed as an out-of-order (OOO) core in order to improve the performance by executing instructions as soon as their operands become available, rather than in the program order. However, the performance benefit may be offset by a considerable increase in the power consumption. When multiple execution threads are available for the operating system to schedule, employing multiple in-order cores rather than large OOO cores may improve the energy consumption profile of the processor without compromising the overall performance. Thus, to improve the performance and energy consumption scalability of a processor, the latter may be designed to support a variable number of cores depending on the performance needs and the number of threads available to the operating system for scheduling.

Figure 8:
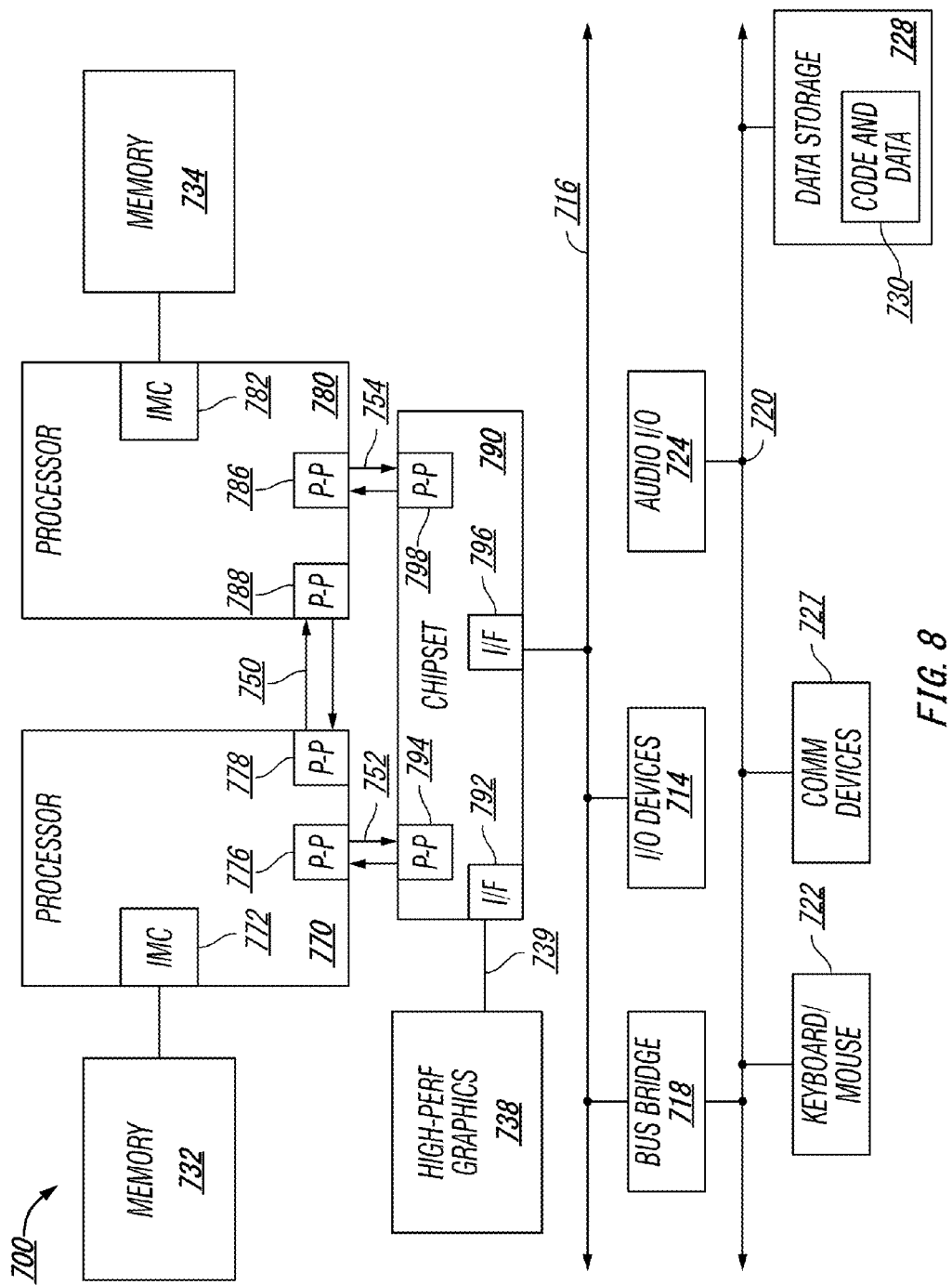
FIG. 8 depicts a block diagram of an example computer system, in accordance with one or more aspects of the present disclosure.

FIG. 8 depicts a block diagram of an example computer system, in accordance with one or more aspects of the present disclosure. As shown in FIG. 8, multiprocessor system 700 is a point-to-point interconnect system, and includes a first processor 770 and a second processor 780 coupled via a point-to-point interconnect 750. Each of processors 770 and 780 may be some version of processing system 100 capable of performing secure delivery of output surface bitmaps to a display engine, as described in more details herein above. While shown with only two processors 770, 780, it is to be understood that the scope of the present disclosure is not so limited. In other embodiments, one or more additional processors may be present in the example computer system.

Processors 770 and 780 are shown including integrated memory controller units 772 and 782, respectively. Processor 770 also includes as part of its bus controller units point-to-point (P-P) interfaces 776 and 778; similarly, second processor 780 includes P-P interfaces 786 and 788. Processors 770, 780 may exchange information via a point-to-point (P-P) interface 750 using P-P interface circuits 778, 788. As shown in FIG. 8, IMCs 772 and 782 couple the processors to respective memories, namely a memory 732 and a memory 734, which may be portions of main memory locally attached to the respective processors.

Processors 770, 780 may each exchange information with a chipset 790 via individual P-P interfaces 752, 754 using point to point interface circuits 776, 794, 786, 798. Chipset 790 may also exchange information with a high-performance graphics circuit 738 via a high-performance graphics interface 739.

A shared cache (not shown) may be included in either processor or outside of both processors, yet connected with the processors via P-P interconnect, such that either or both processors' local cache information may be stored in the shared cache if a processor is placed into a low power mode.

Chipset 790 may be coupled to a first bus 716 via an interface 796. In one embodiment, first bus 716 may be a Peripheral Component Interconnect (PCI) bus, or a bus such as a PCI Express bus or another third generation I/O interconnect bus, although the scope of the present disclosure is not so limited.

As shown in FIG. 8, various I/O devices 714 may be coupled to first bus 716, along with a bus bridge 718 which couples first bus 716 to a second bus 720. In one embodiment, second bus 720 may be a low pin count (LPC) bus. Various devices may be coupled to second bus 720 including, for example, a keyboard and/or mouse 722, communication devices 727 and a storage unit 728 such as a disk drive or other mass storage device which may include instructions/code and data 730, in one embodiment. Further, an audio I/O 724 may be coupled to second bus 720.

Figure 9:
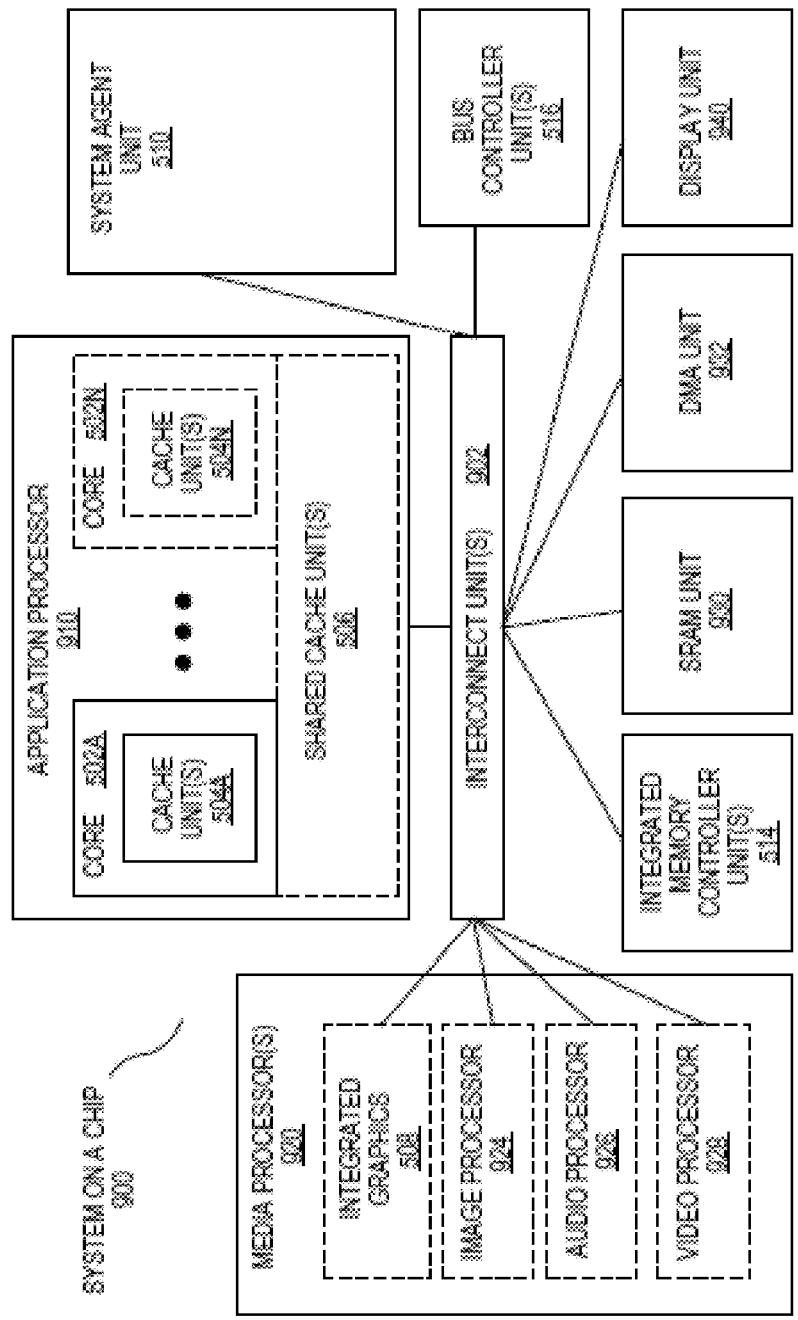
FIG. 9 depicts a block diagram of an example system on a chip (SoC), in accordance with one or more aspects of the present disclosure.

FIG. 9 depicts a block diagram of an example system on a chip (SoC), in accordance with one or more aspects of the present disclosure. The application processor 910 provided by some version of processing system 100 capable of performing secure delivery of surface bitmaps to a display engine, as described in more details herein above. As schematically illustrated by FIG. 9, interconnect unit(s) 902 may be coupled to: an application processor 910 which includes a set of one or more cores 902A-N and shared cache unit(s) 906; a system agent unit 910; a bus controller unit(s) 916; an integrated memory controller unit(s) 914; a set or one or more media processors 920 which may include integrated graphics logic 908, an image processor 924 for providing still and/or video camera functionality, an audio processor 926 for providing hardware audio acceleration, and a video processor 928 for providing video encode/decode acceleration; a static random access memory (SRAM) unit 930; a direct memory access (DMA) unit 932; and a display unit 940 for coupling to one or more external displays.

Figure 10:
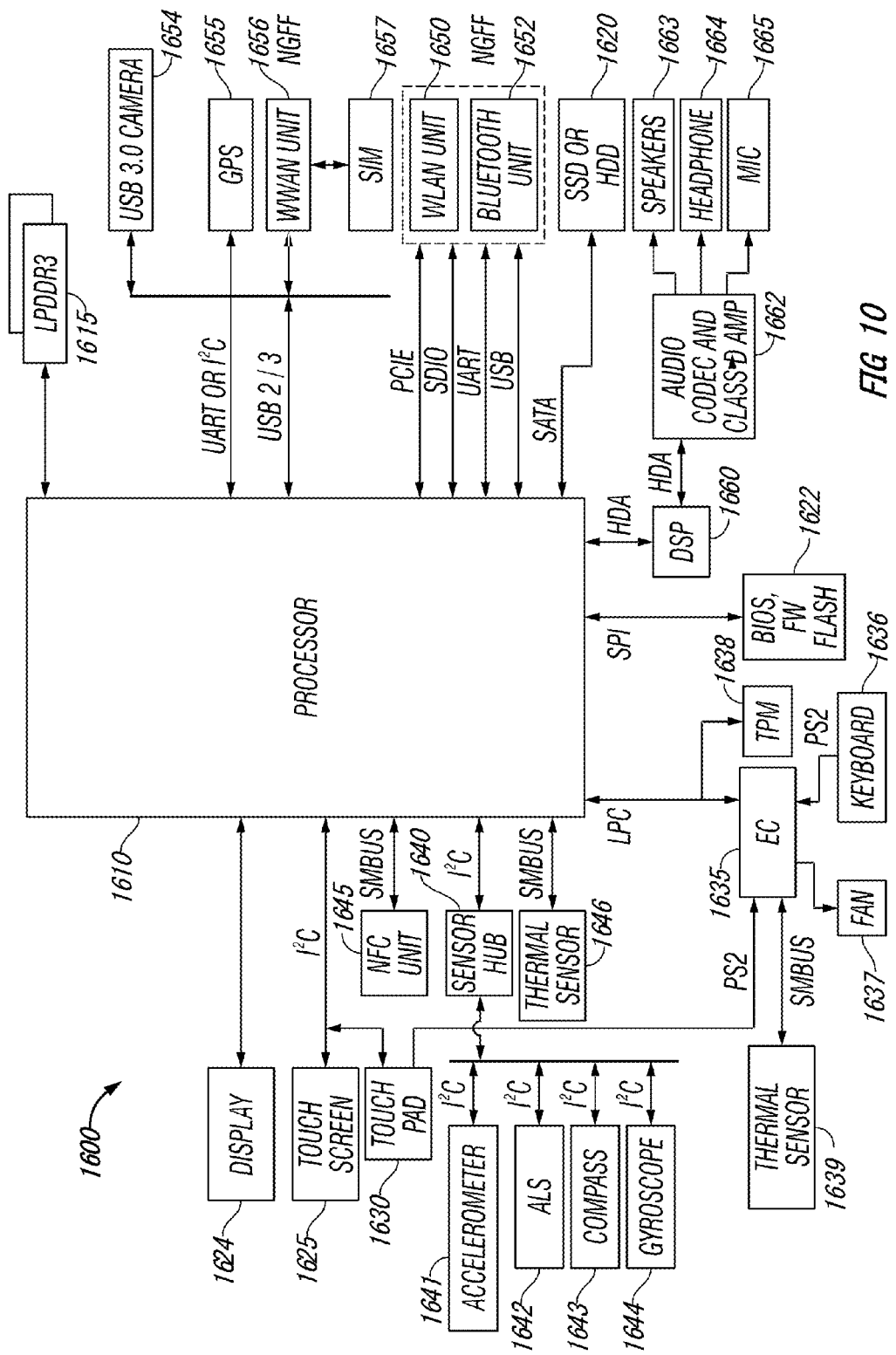
FIG. 10 depicts a block diagram of an example computer system, in accordance with one or more aspects of the present disclosure.

FIG. 10 depicts a block diagram of an example computer system, in accordance with one or more aspects of the present disclosure. Processor 1610 may be provided by some version of processing system 100 capable of performing secure delivery of surface bitmaps to a display engine, as described in more details herein above.

The system 1600 schematically illustrated by FIG. 10 may include any combination of components implemented as ICs, portions thereof, discrete electronic devices, or other modules, logic, hardware, software, firmware, or a combination thereof adapted in a computer system, or as components otherwise incorporated within a chassis of the computer system. The block diagram of FIG. 10 is intended to show a high level view of many components of the computer system. However, it is to be understood that some of the components shown may be omitted, additional components may be present, and different arrangement of the components shown may occur in other implementations.

Processor 1610 may be provided by a microprocessor, multi-core processor, multithreaded processor, an ultra low voltage processor, an embedded processor, or other known processing element. In the illustrated implementation, processor 1610 acts as a main processing unit and central hub for communication with many of the various components of the system 1600. As one example, processor 1600 may be implemented as a system on a chip (SoC). As a specific illustrative example, processor 1610 includes an Intel® Architecture Core™-based processor such as an i3, i5, i7 or another such processor available from Intel Corporation, Santa Clara, Calif.

Processor 1610 may communicate with a system memory 1615. In various implementations the individual memory devices may be of different package types such as single die package (SDP), dual die package (DDP) or quad die package (1P). These devices, in some implementations, may be directly soldered onto a motherboard to provide a lower profile solution, while in other implementations the devices may be configured as one or more memory modules that in turn couple to the motherboard by a given connector. Other memory implementations are possible, such as other types of memory modules, e.g., dual inline memory modules (DIMMs) of different varieties including but not limited to microDIMMs, MiniDIMMs. In one illustrative example, the memory may be sized between 2 GB and 16 GB, and may be configured as a DDR3LM package or an LPDDR2 or LPDDR3 memory that is soldered onto a motherboard via a ball grid array (BGA).

To provide for persistent storage of information such as data, applications, one or more operating systems and so forth, a mass storage 1620 may be also coupled to processor 1610. In certain implementations, to enable a thinner and lighter system design as well as to improve system responsiveness, the mass storage 1620 may be implemented via a SSD. In other implementations, the mass storage may primarily be provided by a hard disk drive (HDD) with a smaller amount of SSD storage to act as a SSD cache to enable non-volatile storage of context state and other such information during power down events so that a fast power up can occur on re-initiation of system activities.

Also shown in FIG. 10, a flash device 1622 may be coupled to processor 1610, e.g., via a serial peripheral interface (SPI). The flash device 1622 may provide for non-volatile storage of system software, including a basic input/output software (BIOS) as well as other firmware of the system.

In various implementations, the mass storage of the system may be provided by a SSD alone or as a disk, optical or other drive with an SSD cache. In some implementations, the mass storage may be provided by an SSD or as a HDD along with a restore (RST) cache module. The SSD cache may be configured as a single level cache (SLC) or multi-level cache (MLC) option to provide an appropriate level of responsiveness.

Various input/output (IO) devices may be present within system 1600, including, e.g., a display 1624 which may be provided by a high definition LCD or LED panel configured within a lid portion of the chassis. This display panel may also provide for a touch screen 1625 adapted externally over the display panel such that via a user's interaction with this touch screen, user inputs can be provided to the system to enable desired operations, e.g., with regard to the display of information, accessing of information and so forth. In certain implementations, display 1624 may be coupled to processor 1610 via a display interconnect that can be implemented as a high performance graphics interconnect. Touch screen 1625 may be coupled to processor 1610 via another interconnect, which in an embodiment can be an I2C interconnect. In addition to touch screen 1625, user input by way of touch can also occur via a touch pad 1630 which may be configured within the chassis and may also be coupled to the same I2C interconnect as touch screen 1625.

Various sensors may be present within the system and may be coupled to processor 1610 in different manners. Certain inertial and environmental sensors may couple to processor 1610 through a sensor hub 1640, e.g., via an I2C interconnect. These sensors may include an accelerometer 1641, an ambient light sensor (ALS) 1642, a compass 1643 and a gyroscope 1644. Other environmental sensors may include one or more thermal sensors 1646 which in some embodiments couple to processor 1610 via a system management bus (SMBus) bus. In certain implementations, one or more infrared or other heat sensing elements, or any other element for sensing the presence or movement of a user may be present.

Various peripheral devices may couple to processor 1610 via a low pin count (LPC) interconnect. In certain implementations, various components can be coupled through an embedded controller 1635. Such components can include a keyboard 1636 (e.g., coupled via a PS2 interface), a fan 1637, and a thermal sensor 1639. In some embodiments, touch pad 1630 may also couple to EC 1635 via a PS2 interface. In addition, a security processor such as a trusted platform module (TPM) 1638 in accordance with the Trusted Computing Group (TCG) TPM Specification Version 1.2, dated Oct. 2, 2003, may also couple to processor 1610 via this LPC interconnect.

In certain implementations, peripheral ports may include a high definition media interface (HDMI) connector (which can be of different form factors such as full size, mini or micro); one or more USB ports, such as full-size external ports in accordance with the Universal Serial Bus Revision 3.0 Specification (November 2008), with at least one powered for charging of USB devices (such as smartphones) when the system is in Connected Standby state and is plugged into AC wall power. In addition, one or more Thunderbolt™ ports can be provided. Other ports may include an externally accessible card reader such as a full size SD-XC card reader and/or a SIM card reader for WWAN (e.g., an 8 pin card reader). For audio, a 3.5 mm jack with stereo sound and microphone capability (e.g., combination functionality) can be present, with support for jack detection (e.g., headphone only support using microphone in the lid or headphone with microphone in cable). In some embodiments, this jack can be re-taskable between stereo headphone and stereo microphone input. Also, a power jack can be provided for coupling to an AC brick.

System 1600 can communicate with external devices in a variety of manners, including wirelessly. In the embodiment shown in FIG. 16, various wireless modules, each of which can correspond to a radio configured for a particular wireless communication protocol, are present. One manner for wireless communication in a short range such as a near field may be via a near field communication (NFC) unit 1645 which may communicate, in one embodiment with processor 1610 via an SMBus.

Additional wireless units can include other short range wireless engines including a WLAN unit 1650 and a Bluetooth unit 1652. Using WLAN unit 1650, WiFi™ communications in accordance with a given Institute of Electrical and Electronics Engineers (IEEE) 802.11 standard can be realized, while via Bluetooth unit 1652, short range communications via a Bluetooth protocol can occur. These units may communicate with processor 1610 via, e.g., a USB link or a universal asynchronous receiver transmitter (UART) link. Or these units may couple to processor 1610 via an interconnect according to a Peripheral Component Interconnect Express™ (PCIe™) protocol, e.g., in accordance with the PCI Express™ Specification Base Specification version 3.0 (published Jan. 17, 2007), or another such protocol such as a serial data input/output (SDIO) standard. Of course, the actual physical connection between these peripheral devices, which may be configured on one or more add-in cards, can be by way of the NGFF connectors adapted to a motherboard.

In addition, wireless wide area communications, e.g., according to a cellular or other wireless wide area protocol, can occur via a WWAN unit 1656 which in turn may couple to a subscriber identity module (SIM) 1657. In addition, to enable receipt and use of location information, a GPS module 1655 may also be present.

To provide for audio inputs and outputs, an audio processor can be implemented via a digital signal processor (DSP) 1660, which may couple to processor 1610 via a high definition audio (HDA) link. Similarly, DSP 1660 may communicate with an integrated coder/decoder (CODEC) and amplifier 1662 that in turn may couple to output speakers 1663 which may be implemented within the chassis. Similarly, amplifier and CODEC 1662 can be coupled to receive audio inputs from a microphone 1665.

Figure 11:
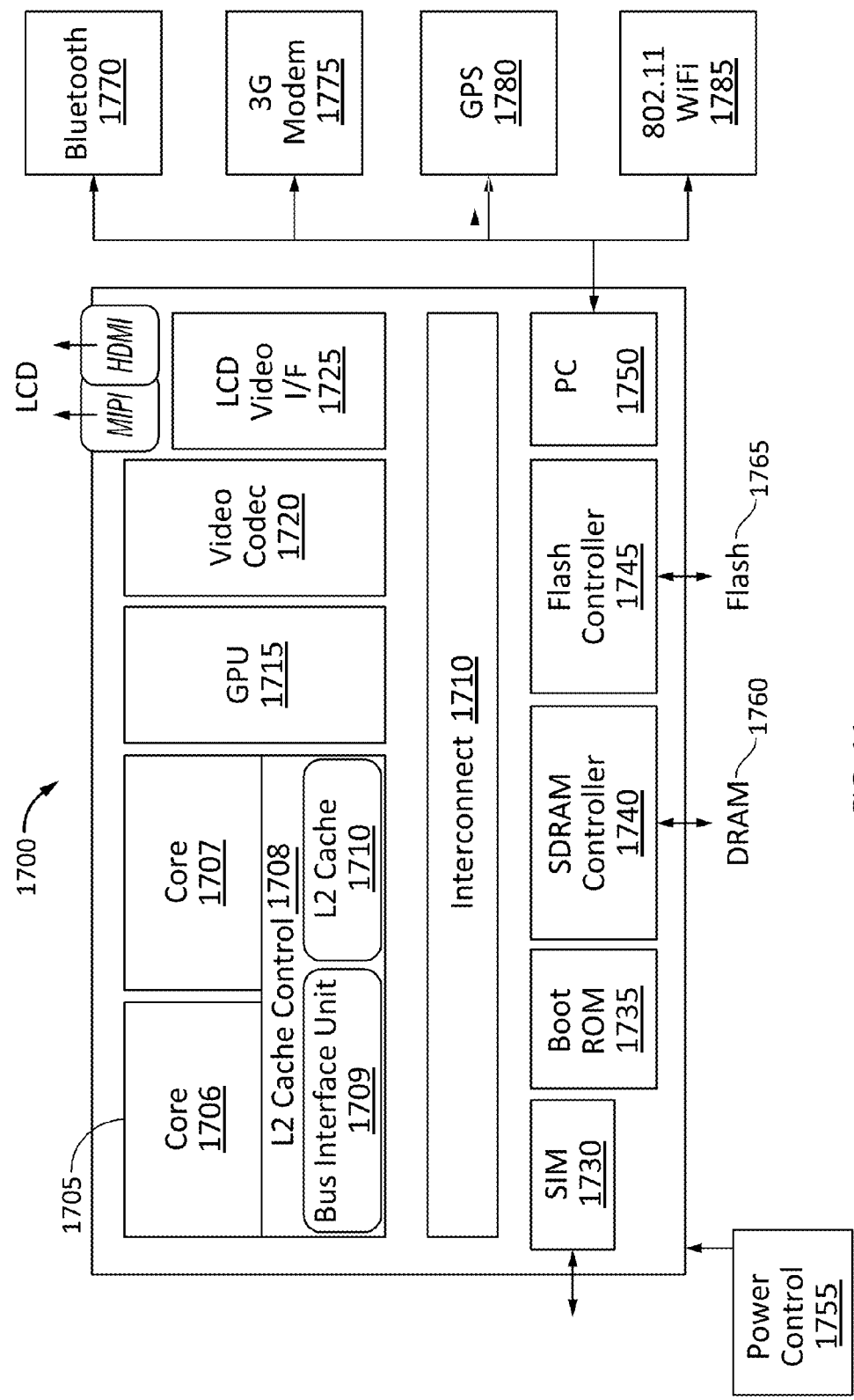
FIG. 11 depicts a block diagram of an example system on a chip (SoC), in accordance with one or more aspects of the present disclosure.

FIG. 11 depicts a block diagram of an example system on a chip (SoC), in accordance with one or more aspects of the present disclosure. As a specific illustrative example, SOC 1700 may be included in user equipment (UE). In one embodiment, UE refers to any device to be used by an end-user to communicate, such as a hand-held phone, smartphone, tablet, ultra-thin notebook, notebook with broadband adapter, or any other similar communication device. Often a UE connects to a base station or node, which potentially corresponds in nature to a mobile station (MS) in a GSM network.

As schematically illustrated by FIG. 11, SOC 1700 may include two cores. Cores 1706 and 1707 may be coupled to cache control 1708 that is associated with bus interface unit 1709 and L2 cache 1710 to communicate with other parts of system 1700. Interconnect 1710 may include an on-chip interconnect, such as an IOSF, AMBA, or other interconnect.

Interface 1710 may provide communication channels to the other components, such as a Subscriber Identity Module (SIM) 1730 to interface with a SIM card, a boot ROM 1735 to hold boot code for execution by cores 1706 and 1707 to initialize and boot SOC 1700, a SDRAM controller 1740 to interface with external memory (e.g., DRAM 1760), a flash controller 1745 to interface with non-volatile memory (e.g., flash 1765), a peripheral control 1550 (e.g., Serial Peripheral Interface) to interface with peripherals, video codecs 1720 and Video interface 1725 to display and receive input (e.g., touch enabled input), GPU 1715 to perform graphics related computations, etc. In addition, the system may comprise peripherals for communication, such as a Bluetooth module 1770, 3G modem 1775, GPS 1785, and WiFi 1785.

Other computer system designs and configurations may also be suitable to implement the systems and methods described herein. The following examples illustrate various implementations in accordance with one or more aspects of the present disclosure.

Example 1 is a processing system, comprising: an architecturally protected memory and a processing core communicatively coupled to the architecturally protected memory, the processing core comprising a processing logic configured to implement an architecturally-protected execution environment by performing at least one of: executing instructions residing in the architecturally protected memory and preventing an unauthorized access to the architecturally protected memory. The processing logic may be further configured to provide a secure video output path by generating an output surface bitmap encrypted with a first encryption key and storing an encrypted first encryption key in an external memory, wherein the encrypted first encryption key is produced by encrypting the first encryption key with a second encryption key.

In Example 2, the architecturally protected memory of the processing system of Example 1 may be provided by an enclave page cache (EPC).

In Example 3, the processing logic of the processing system of Example 1 may be configured to implement a secure enclave.

In Example 4, the processing logic of the processing system of Example 1 may be further configured to store the output surface bitmap in the external memory.

The Example 5, the processing system of Example 1 may further comprise a graphic functional unit configured to decrypt the encrypted first encryption key, decrypt the output surface bitmap using the first encryption key, and render the output surface bitmap.

In Example 6, the graphic functional unit of the processing system of Example 5 may be provided by a display engine.

The Example 7, the processing system of Example 1 may be further configured to implement an instruction for encrypting the first encryption key and binding the first encryption key to a policy specifying one or more interfaces to be employed for rendering output surfaces encrypted with the first encryption key.

Example 8 is a method, comprising: generating, by an application being executed within an architecturally protected execution environment of a processing system, a surface encryption key; generating an output surface bitmap encrypted with the surface encryption key; producing an encrypted surface encryption key by encrypting, using a key wrapping key, the surface encryption key; and storing the encrypted surface encryption key in a memory buffer accessible by a graphic functional unit.

In Example 9, the method of Example 8 may further comprise: generating the key wrapping key by a micro-code executed by the processing system; and storing the surface encryption key in a register of the graphic functional unit.

In Example 10, the method of Example 8 may further comprise: retrieving, by the graphic functional unit, the key wrapping key; decrypting, using the key wrapping key, the encrypted surface encryption key; decrypting the output surface bitmap using the surface encryption key; and rendering the output surface bitmap.

In Example 11, the graphic functional unit of the method of Example 8 may be provided by a display engine.

In Example 12, the architecturally protected execution environment of the method of Example 8 may be provided by a secure enclave.

In Example 13, the architecturally protected execution environment of the method of Example 8 may comprise a protected memory.

In Example 14, the surface encryption key of the method of Example 8 may be generated using a random number generator.

In Example 15, the method of Example 8 may further comprise: implementing a replay protection by applying a key derivation function to a random number and a surface counter to generate the surface encryption key.

In Example 15, producing the encrypted surface encryption key of the method of Example 8 may comprise binding the surface encryption key to a policy specifying one or more interfaces to be employed for rendering output surfaces encrypted with the surface encryption key.

Example 17 is an apparatus comprising: a memory and a processing system coupled to the memory, the processing system being configured to perform the method of any of the Examples 8-16.

Example 18 is a computer-readable non-transitory storage medium comprising executable instructions that, when executed by a processing system, cause the processing system to perform operations, comprising: generating, by an application being executed within an architecturally protected execution environment of the processing system, a surface encryption key; generating an output surface bitmap encrypted with the surface encryption key; producing an encrypted surface encryption key by encrypting, using a key wrapping key, the surface encryption key; and storing the encrypted surface encryption key in a memory buffer accessible by a graphic functional unit.

In Example 19, the computer-readable non-transitory storage medium of Example 18 may further comprising executable instructions causing the processing system to perform operations, comprising: generating the key wrapping key by a micro-code executed by the processing system; and storing the surface encryption key in a register of the graphic functional unit.

In Example 20, the computer-readable non-transitory storage medium of Example 18 may further comprising executable instructions causing the processing system to perform operations, comprising: retrieving, by the graphic functional unit, the key wrapping key; decrypting, using the key wrapping key, the encrypted surface encryption key; decrypting the output surface bitmap using the surface encryption key; and rendering the output surface bitmap.

In Example 21, the graphic functional unit of the computer-readable non-transitory storage medium of Example 18 may be provided by a display engine.

In Example 22, the architecturally protected execution environment of the computer-readable non-transitory storage medium of Example 18 may be provided by a secure enclave.

In Example 23, the architecturally protected execution environment of the computer-readable non-transitory storage medium of Example 18 may comprise a protected memory.

In Example 23, the surface encryption key of the computer-readable non-transitory storage medium of Example 18 may be generated using a random number generator.

In Example 24, the computer-readable non-transitory storage medium of Example 18 may further comprising executable instructions causing the processing system to perform operations, comprising: implementing a replay protection by applying a key derivation function to a random number and a surface counter to generate the surface encryption key.

In Example 26, producing the encrypted surface encryption key of the computer-readable non-transitory storage medium of claim 18, may comprise binding the surface encryption key to a policy specifying one or more interfaces to be employed for rendering output surfaces encrypted with the surface encryption key.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "encrypting," "decrypting," "storing," "providing," "deriving," "obtaining," "receiving," "authenticating," "deleting," "executing," "requesting," "communicating," or the like, refer to the actions and processes of a computing system, or similar electronic computing device, that manipulates and transforms data represented as physical (e.g., electronic) quantities within the computing system's registers and memories into other data similarly represented as physical quantities within the computing system memories or registers or other such information storage, transmission or display devices.

The words "example" or "exemplary" are used herein to mean serving as an example, instance or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Also, the terms "first," "second," "third," "fourth," etc. as used herein are meant as labels to distinguish among different elements and may not necessarily have an ordinal meaning according to their numerical designation.

Embodiments descried herein may also relate to an apparatus for performing the operations herein. This apparatus may be specially constructed for the required purposes, or it may comprise a general-purpose computer selectively activated or reconfigured by a computer program stored in the computer. Such a computer program may be stored in a non-transitory computer-readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, flash memory, or any type of media suitable for storing electronic instructions. The term "computer-readable storage medium" should be taken to include a single medium or multiple media (e.g., a centralized or distributed database and/or associated caches and servers) that store the one or more sets of instructions. The term "computer-readable medium" shall also be taken to include any medium that is capable of storing, encoding or carrying a set of instructions for execution by the machine and that causes the machine to perform any one or more of the methodologies of the present embodiments. The term "computer-readable storage medium" shall accordingly be taken to include, but not be limited to, solid-state memories, optical media, magnetic media, any medium that is capable of storing a set of instructions for execution by the machine and that causes the machine to perform any one or more of the methodologies of the present embodiments.

The algorithms and displays presented herein are not inherently related to any particular computer or other apparatus. Various general-purpose systems may be used with programs in accordance with the teachings herein, or it may prove convenient to construct a more specialized apparatus to perform the required method operations. The required structure for a variety of these systems will appear from the description below. In addition, the present embodiments are not described with reference to any particular programming language. It will be appreciated that a variety of programming languages may be used to implement the teachings of the embodiments as described herein.

The above description sets forth numerous specific details such as examples of specific systems, components, methods and so forth, in order to provide a good understanding of several embodiments. It will be apparent to one skilled in the art, however, that at least some embodiments may be practiced without these specific details. In other instances, well-known components or methods are not described in detail or are presented in simple block diagram format in order to avoid unnecessarily obscuring the present embodiments. Thus, the specific details set forth above are merely exemplary. Particular implementations may vary from these exemplary details and still be contemplated to be within the scope of the present embodiments.

It is to be understood that the above description is intended to be illustrative and not restrictive. Many other embodiments will be apparent to those of skill in the art upon reading and understanding the above description. The scope of the present embodiments should, therefore, be determined with reference to the appended claims, along with the full scope of equivalents to which such claims are entitled.

The invention claimed is:

1. A processing system, comprising:
an architecturally protected memory; and
a hardware processing core, communicatively coupled to the architecturally protected memory, to implement an architecturally-protected execution environment by performing at least one of: executing instructions residing in the architecturally protected memory or preventing an unauthorized access to the architecturally protected memory;
wherein the hardware processing core is further to:
store, during a reset sequence of the processing system, a key wrapping key in a register of a graphic device;
generate, using an application being executed within the architecturally protected execution environment, a surface encryption key;
generate an output surface encrypted with the surface encryption key;
produce an encrypted surface encryption key by encrypting the surface encryption key using the key wrapping key;
bind the surface encryption key to a policy identifying a type of an output interface to be employed for rendering output surfaces encrypted with the surface encryption key; and
store the encrypted surface encryption key in an external memory.

2. The processing system of claim 1, wherein the architecturally protected memory is provided by an enclave page cache (EPC).

3. The processing system of claim 1, wherein the hardware processing core is to implement a secure enclave.

4. The processing system of claim 1, wherein the hardware processing core is further to store the output surface in the external memory.

5. The processing system of claim 1, wherein the graphic device is to decrypt the encrypted surface encryption key, decrypt the output surface using the surface encryption key, and render the output surface.

6. The processing system of claim 1, wherein the graphic device is provided by a display engine.

7. The processing system of claim 1, wherein the hardware processing core is further to implement an instruction for encrypting the surface encryption key and binding the surface encryption key to a policy specifying one or more interfaces to be employed for rendering output surfaces encrypted with the surface encryption key.

8. A method, comprising:
implementing, by a processing system comprising a hardware processing core communicatively coupled to an architecturally protected memory, an architecturally-protected execution environment by performing at least one of: executing instructions residing in the architecturally protected memory or preventing an unauthorized access to the architecturally protected memory;
storing, by the hardware processing core, during a reset sequence of the processing system, a key wrapping key in a register of a graphic device;
generating, by an application being executed by the hardware processing core within the architecturally protected execution environment, a surface encryption key;
generating, by the hardware processing core, an output surface encrypted with the surface encryption key;
producing, by the hardware processing core, an encrypted surface encryption key by encrypting the surface encryption key using the key wrapping key;
binding, by the hardware processing core, the surface encryption key to a bit sequence comprising a plurality of bits, wherein each bit of the plurality of bits indicates whether a corresponding output interface type is allowed for rendering output surfaces encrypted with the surface encryption key; and
storing, by the hardware processing core, the encrypted surface encryption key in a memory buffer accessible by a graphic device.

9. The method of claim 8, further comprising:
retrieving, by the graphic device, the key wrapping key;
decrypting, using the key wrapping key, the encrypted surface encryption key;
decrypting the output surface using the surface encryption key; and
rendering the output surface.

10. The method of claim 8, wherein the graphic device is provided by a display engine.

11. The method of claim 8, wherein the architecturally protected execution environment is provided by a secure enclave.

12. The method of claim 8, wherein the architecturally protected execution environment comprises a protected memory.

13. The method of claim 8, wherein the surface encryption key is generated using a random number generator.

14. The method of claim 8, further comprising implementing a replay protection by applying a key derivation function to a random number and a surface counter to generate the surface encryption key.

15. A computer-readable non-transitory storage medium comprising executable instructions that, when executed by a processing system comprising a hardware processing core communicatively coupled to an architecturally protected memory, cause the processing system to perform operations, comprising:
implementing an architecturally-protected execution environment by performing at least one of: executing instructions residing in the architecturally protected memory or preventing an unauthorized access to the architecturally protected memory;
storing, during a reset sequence of the processing system, a key wrapping key in a register of a graphic device;
generating, by an application being executed within the architecturally protected execution environment, a surface encryption key;
generating an output surface encrypted with the surface encryption key;
producing an encrypted surface encryption key by encrypting the surface encryption key using the key wrapping key;
binding the surface encryption key to a bit sequence comprising a plurality of bits, wherein each bit of the plurality of bits indicates whether a corresponding output interface type is allowed for rendering output surfaces encrypted with the surface encryption key; and
storing the encrypted surface encryption key in a memory buffer accessible by a graphic device.

16. The computer-readable non-transitory storage medium of claim 15, further comprising executable instructions causing the processing system to perform operations, comprising:

retrieving, by the graphic device, the key wrapping key;

decrypting, using the key wrapping key, the encrypted surface encryption key;

decrypting the output surface using the surface encryption key; and rendering the output surface.

17. The computer-readable non-transitory storage medium of claim 15, wherein the architecturally protected execution environment is provided by a secure enclave.

18. The computer-readable non-transitory storage medium of claim 15, wherein producing the encrypted surface encryption key comprises binding the surface encryption key to a policy specifying one or more interfaces to be employed for rendering output surfaces encrypted with the surface encryption key.

19. The computer-readable non-transitory storage medium of claim 15, further comprising executable instructions the processing system to implement a replay protection by applying a key derivation function to a random number and a surface counter to generate the surface encryption key.

20. The system of claim 1, wherein the hardware processing core is further to: bind the surface encryption key to a policy identifying a target device to be employed for rendering output surfaces encrypted with the surface encryption key.

* * * * *